United States Patent
Thillainadarajah et al.

(10) Patent No.: US 12,430,523 B2
(45) Date of Patent: Sep. 30, 2025

(54) SYSTEMS AND METHODS FOR MONITORING A PLURALITY OF ASSETS

(71) Applicant: Smart Skin Technologies Inc., Fredericton (CA)

(72) Inventors: Kumaran Thillainadarajah, Fredericton (CA); Evan Justason, Bocabec (CA); Michael David Bonga, Saint John (CA); Ryan Proudfoot, Taymouth (CA); Abhishek Kar, Fredericton (CA); Jonathan Halse, Saint Andrews (CA); Jordan Ritchie, Island View (CA); Nitin Kumar, Fredericton (CA); Daniel Robert Rogers, McLeod Hill (CA); Ahmed Alsaggaf, Fredericton (CA); Roua M. Razak, Mississauga (CA)

(73) Assignee: SMART SKIN TECHNOLOGIES INC., Fredericton (CA)

( * ) Notice: Subject to any disclaimer, the term of this patent is extended or adjusted under 35 U.S.C. 154(b) by 22 days.

(21) Appl. No.: 18/291,659

(22) PCT Filed: Jun. 9, 2022

(86) PCT No.: PCT/CA2022/050920
§ 371 (c)(1),
(2) Date: Jan. 24, 2024

(87) PCT Pub. No.: WO2023/004495
PCT Pub. Date: Feb. 2, 2023

(65) Prior Publication Data
US 2025/0068868 A1    Feb. 27, 2025

Related U.S. Application Data

(60) Provisional application No. 63/227,063, filed on Jul. 29, 2021.

(51) Int. Cl.
G06K 7/10        (2006.01)
G06K 17/00       (2006.01)
(Continued)

(52) U.S. Cl.
CPC ..... *G06K 7/10435* (2013.01); *G06K 17/0022* (2013.01); *G06Q 10/08* (2013.01);
(Continued)

(58) Field of Classification Search
CPC .. G06K 7/10435; G06K 17/0022; G01H 1/00; G01H 17/00; G06Q 10/08;
(Continued)

(56) References Cited

U.S. PATENT DOCUMENTS 5,742,237 A      4/1998   Bledsoe
7,378,967 B2 *   5/2008   Sullivan ............... G06K 7/0095
                                                    340/505

(Continued)

FOREIGN PATENT DOCUMENTS

EP    2267662 A2    12/2010
EP    2733502 A1    5/2014

(Continued)

OTHER PUBLICATIONS

Extended European Search Report issued Jul. 5, 2018 in the corresponding EP Patent Application No. 15865394.9 (8 pages).
(Continued)

*Primary Examiner* — Adnan Aziz

(57) ABSTRACT

Systems and methods for monitoring a plurality of assets using a plurality of location tags are provided. The plurality of assets includes a conveyor system and at least one other asset. At least a subset of the location tags is positioned at a fixed position along the conveyor system, and at least one location tag is positioned at the at least one other asset. Each location tag includes at least one environmental sensor and (Continued)

a communication interface. The communication interface is configured to transmit a sensor signal to a network system and at least one information signal to a mobile receiver. The mobile receiver moves with respect to the conveyor system such that the distance between the mobile receiver and the subset of the location tags continuously changes, and a position of the mobile receiver is determined based on a signal strength of the information signal.

20 Claims, 14 Drawing Sheets

(51) Int. Cl.
| | |
|---|---|
| G06Q 10/08 | (2023.01) |
| G01H 1/00 | (2006.01) |
| G01S 5/02 | (2010.01) |
| G01S 5/14 | (2006.01) |
| G05B 19/418 | (2006.01) |
| G06Q 10/087 | (2023.01) |
| G06Q 50/04 | (2012.01) |
| H04W 4/38 | (2018.01) |

(52) U.S. Cl.
CPC ............... *G01H 1/00* (2013.01); *G01S 5/02* (2013.01); *G01S 5/02521* (2020.05); *G01S 5/14* (2013.01); *G05B 19/4184* (2013.01); *G05B 2219/31439* (2013.01); *G06Q 10/087* (2013.01); *G06Q 50/04* (2013.01); *H04W 4/38* (2018.02)

(58) Field of Classification Search
CPC .......... G01S 5/02; G01S 5/02521; G01S 5/14; G01S 5/00; G05B 19/4184; B65G 43/00
See application file for complete search history.

(56) References Cited

U.S. PATENT DOCUMENTS

| | | | |
|---|---|---|---|
| 10,386,453 | B2 | 8/2019 | Thillainadarajah et al. |
| 10,572,703 | B1* | 2/2020 | Shyamkumar ..... G06K 7/10386 |
| 2002/0014533 | A1 | 2/2002 | Zhu et al. |
| 2003/0137968 | A1 | 7/2003 | Laruea et al. |
| 2005/0171738 | A1* | 8/2005 | Kadaba ................. G07C 5/085 702/187 |
| 2006/0208887 | A1 | 9/2006 | Fields et al. |
| 2008/0061939 | A1 | 3/2008 | Davis et al. |
| 2009/0286548 | A1 | 11/2009 | Coronel et al. |
| 2014/0132411 | A1 | 5/2014 | Buchheim et al. |
| 2014/0135041 | A1 | 5/2014 | Buchheim et al. |
| 2014/0135042 | A1 | 5/2014 | Buchheim et al. |
| 2014/0347165 | A1 | 11/2014 | Bremer |
| 2014/0364974 | A1* | 12/2014 | Wohl ................. G09B 19/0038 700/91 |
| 2014/0366650 | A1 | 12/2014 | Thillainadarajah et al. |
| 2014/0370917 | A1 | 12/2014 | Buchheim et al. |
| 2015/0149837 | A1* | 5/2015 | Alonso ............. G06K 7/10366 714/57 |
| 2015/0301521 | A1 | 10/2015 | Byron et al. |
| 2017/0363708 | A1* | 12/2017 | Thillainadarajah ... G01S 5/0294 |
| 2019/0340396 | A1* | 11/2019 | Mills .................... G06Q 10/087 |
| 2020/0048012 | A1* | 2/2020 | Andreoli ................ B65G 43/00 |

FOREIGN PATENT DOCUMENTS

| | | |
|---|---|---|
| JP | 201499857 A | 5/2014 |
| WO | 2011009767 A2 | 1/2011 |
| WO | 2014135920 A1 | 9/2014 |
| WO | 2016086312 A1 | 6/2016 |

OTHER PUBLICATIONS

Faragher et al. An Analysis of the Accuracy of Bluetooth Low Energy for Indoor Positioning Applications. In Proceedings of the 27th International Technical Meeting of the Satellite Division of the Institute of Navigation (ION GNSS+ 2014), Tampa, Florida, published Sep. 12, 2014, 10 pages.

International Search Report and Written Opinion mailed on Mar. 8, 2016 in the corresponding International Patent Application No. PCT/CA2015/051271 (9 pages).

International Search Report and Written Opinion mailed on Aug. 18, 2022 in the corresponding International Patent Application No. PCT/CA2022/050920 (11 pages).

Extended European Search Report dated Apr. 10, 2025 issued in European Patent Application No. 22847746.9 (6 pages).

\* cited by examiner

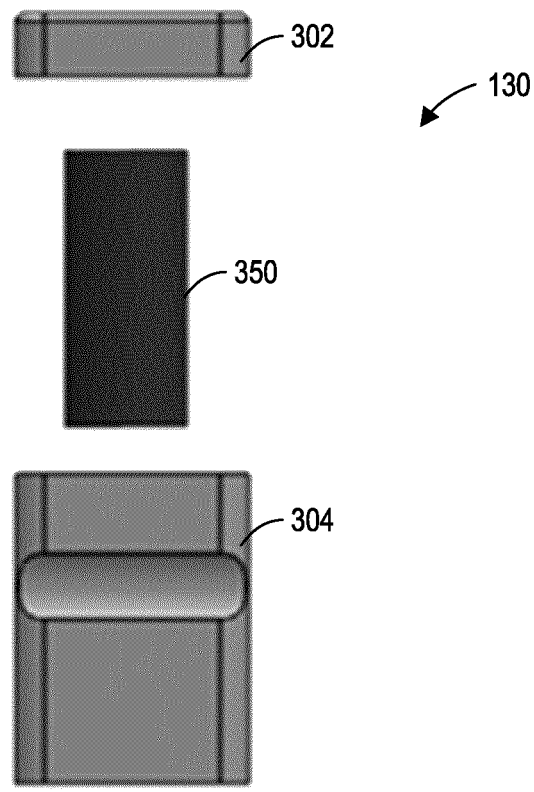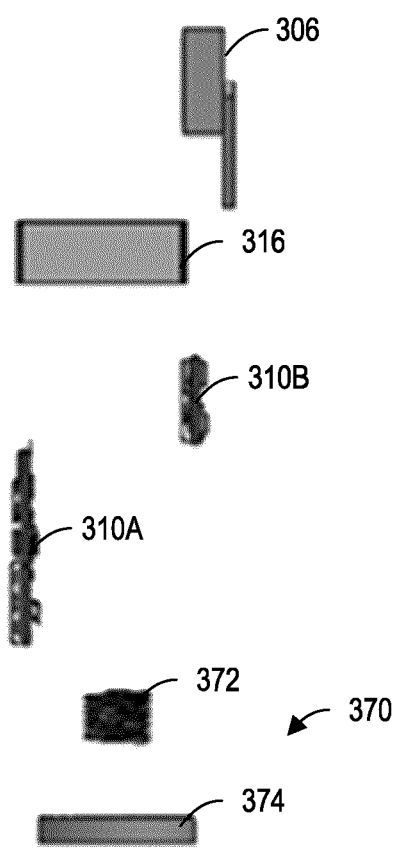
FIG. 4

SYSTEMS AND METHODS FOR MONITORING A PLURALITY OF ASSETS

CROSS-REFERENCE TO PRIOR APPLICATION

This application claims the benefit of priority to U.S. Provisional Patent Application Ser. No. 63/227,063, filed Jul. 29, 2021, which is incorporated herein by reference in its entirety.

FIELD

The described embodiments generally relate to monitoring assets, and, in particular, to location and environmental monitoring.

BACKGROUND

The following is not an admission that anything discussed below is part of the prior art or part of the common general knowledge of a person skilled in the art.

Various industrial, commercial, or manufacturing facilities can include various assets. For example, a manufacturing plant can include a manufacturing line. The manufacturing line can transport articles (such as, cans, boxes, bottles, etc.) to several sub-stations of the manufacturing line. During the conveying process, the articles may experience varying forces from manufacturing line apparatus and from adjacent articles. Further, the articles may experience varying motions and orientations. Manufacturing plant costs and efficiency are likely to be impacted by whether the articles are effectively and efficiently handled on the manufacturing line.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, there is provided a system for monitoring a plurality of assets. The plurality of assets includes a conveyor system and at least one other asset. The system includes: a plurality of location tags. At least a subset of the location tags is positioned at a fixed position along the conveyor system, and at least one location tag is positioned at the at least one other asset. A mobile receiver is moveable with respect to the conveyor system such that the distance between the mobile receiver and the subset of the location tags is changeable. Each location tag includes at least one environmental sensor configured to measure at least one environmental characteristic at the location of the tag. Each location tag includes a communication interface configured to transmit a sensor signal corresponding to the at least one environmental characteristic to a network system. The communication interface of each location tag is configured to transmit at least one information signal to the mobile receiver. A position of the mobile receiver is determined based on a signal strength of the corresponding information signal. The communication interface of each location tag is configured to transmit the sensor signal at a pre-determined transmission interval.

In some embodiments, at least one location tag may be operable to detect at least one trigger event when at least one environmental characteristic measured by the at least one location tag exceeds a predetermined threshold, and in response to detecting the at least one trigger event, transmit an alert to the network system.

In some embodiments, at least one of i) the network system and ii) at least one location tag, may be operable to detect at least one trigger event when at least one environmental characteristic measured by the at least one location tag exceeds a predetermined threshold, and in response to detecting the at least one trigger event, adjust the transmission interval for transmitting the sensor signal at the at least one location tag.

In some embodiments, at least one of i) the network system and ii) at least one location may be is operable to detect at least one trigger event when at least one environmental characteristic measured by the at least one location tag exceeds a predetermined threshold, and in response to detecting the at least one trigger event, adjust a sensing interval for measuring the at least one environmental characteristic at the at least one location tag.

In some embodiments, the at least one environmental sensor may include at least one vibration sensor.

In some embodiments, the sensor signal may include: i) a time series of vibration measurements, or ii) a frequency series of vibration measurements.

In some embodiments, the sensor signal may include at least one vibration event, and the location tag may detect a vibration event if: a magnitude of a vibration measurement exceeds a predetermined vibration magnitude, or ii) a frequency of a vibration measurement is within a predetermined vibration frequency band.

In some embodiments, the at least one vibration event may be transmitted at a first transmission interval, and the at least one of the time series of vibration measurements and the frequency series of vibration measurements may be transmitted at a second transmission interval that is slower than the first transmission interval.

In some embodiments, each location tag may include a rigid housing body; and the at least one environmental sensor and the communication module may be rigidly mounted within the rigid housing body so that the corresponding location tag has a mounted natural frequency greater than the frequency of the vibrations measured by the at least one vibration sensor.

In some embodiments, the at least one environmental sensor may include at least one accelerometer.

In some embodiments, the sensor signal may include at least one of: i) a time series of acceleration measurements, and ii) a frequency series of acceleration measurements.

In some embodiments, the at least one environmental sensor may include at least one gyroscope.

In some embodiments, the at least one environmental sensor may include at least one optical sensor.

In some embodiments, the at least one environmental sensor may include at least one audio sensor.

In some embodiments, the at least one environmental sensor may include at least one atmospheric sensor; and at least one channel may extend between the exterior of the location tag and the at least one atmospheric sensor, the at least one channel selectively sealed by a liquid impermeable membrane so that air can enter the at least one channel.

In some embodiments, the at least one atmospheric sensor may include at least one ambient temperature sensor.

In some embodiments, the at least one environmental sensor may include at least one contact temperature sensor.

In some embodiments, the at least one atmospheric sensor may include at least one humidity sensor.

In some embodiments, the at least one atmospheric sensor may include at least one air pressure sensor.

In some embodiments, the at least one atmospheric sensor may include at least one gas sensor.

In some embodiments, the at least one gas sensor may be configured to detect a presence of one or more volatile organic compounds (VOC).

In some embodiments, the at least one environmental sensor may include at least one radiation sensor.

In some embodiments, each location tag may include a power supply and at least one regulator, the at least one regulator operable to receive electrical power having a first power level from the power supply and generate electrical power having a second power level that is different from the first power level, the at least one environmental sensor may be operable at the first power level directly from the power supply, and at least one other environmental sensor is operable at the second power level received from the at least one regulator.

In some embodiments, each location tag may include an attachment member configured to fix the location tag to the corresponding asset.

In some embodiments, the attachment member may include a magnet having a threaded opening.

In some cases, the mobile receiver is a location tag that is capable of moving with respect to a conveyor system. In some other cases, the mobile receiver comprises a location tag, when can be affixed to or adjacent to or otherwise coupled to the mobile receiver so that the location tag is capable of moving along with the mobile receiver when in operation.

In accordance with an aspect of this disclosure, there is provided a method for monitoring a plurality of assets using a plurality of location tags. The plurality of assets includes a conveyor system and at least one other asset. At least a subset of the location tags is positioned at a fixed position along the conveyor system. At least one location tag positioned at the at least one other asset. A mobile receiver is moveable with respect to the conveyor system such that the distance between the mobile receiver and the subset of the location tags is changeable. The method includes measuring, at each location tag, at least one environmental characteristic at the location of the tag; transmitting, at each location tag, a sensor signal corresponding to the at least one environmental characteristic to a network system; and transmitting, at each location tag, at least one information signal to the mobile receiver. A position of the mobile receiver is determined based on a signal strength of the corresponding information signal and the sensor signal is transmitted at a pre-determined transmission interval.

In some embodiments, the method may further include detecting at least one trigger event when at least one environmental characteristic measured by the at least one location tag exceeds a predetermined threshold, and in response to detecting the at least one trigger event, transmitting an alert to the network system.

In some embodiments, the method may further include detecting at least one trigger event when at least one environmental characteristic measured by the at least one location tag exceeds a predetermined threshold, and in response to detecting the at least one trigger event, adjusting the transmission interval for transmitting the sensor signal at the at least one location tag.

In some embodiments, the method may further include detecting at least one trigger event when at least one environmental characteristic measured by the at least one location tag exceeds a predetermined threshold, and in response to detecting the at least one trigger event, adjusting a sensing interval for measuring the at least one environmental characteristic at the at least one location tag.

In some embodiments, the at least one environmental characteristic may include at least one vibration characteristic.

In some embodiments, the sensor signal may include: i) a time series of vibration measurements, or ii) a frequency series of vibration measurements.

In some embodiments, the sensor signal may include at least one vibration event, and the location tag may detect a vibration event if: a magnitude of a vibration measurement exceeds a predetermined vibration magnitude, or ii) a frequency of a vibration measurement is within a predetermined vibration frequency band.

In some embodiments, the at least one vibration event may be transmitted at a first transmission interval, and the at least one of the time series of vibration measurements and the frequency series of vibration measurements may be transmitted at a second transmission interval that is slower than the first transmission interval.

In some embodiments, the at least one environmental characteristic may include time series of acceleration measurements.

In some embodiments, the sensor signal may include at least one of: i) a time series of acceleration measurements, and ii) a frequency series of acceleration measurements.

In some embodiments, the at least one environmental characteristic may include at least one orientation or angular velocity characteristic.

In some embodiments, the at least one environmental characteristic may include at least one optical characteristic.

In some embodiments, the at least one environmental characteristic may include at least one audio characteristic.

In some embodiments, the at least one environmental characteristic may include at least one atmospheric characteristic.

In some embodiments, the at least one environmental characteristic may include at least one temperature characteristic.

In some embodiments, the at least one environmental characteristic may include at least one humidity characteristic.

In some embodiments, the at least one environmental characteristic may include at least one air pressure characteristic.

In some embodiments, the at least one environmental characteristic may include at least one gas characteristic.

In some embodiments, the at least one gas characteristic may include a presence of one or more volatile organic compounds (VOC).

In some embodiments, the at least one environmental characteristic may include at least one radiation characteristic.

In accordance with an aspect of this disclosure, there is provided a system for monitoring a plurality of assets. The system includes a plurality of location tags. Each location tag is positioned at a corresponding asset. Each location tag includes at least one environmental sensor configured to measure at least one environmental characteristic at a location of the corresponding location tag. Each location tag includes a communication interface configured to transmit a sensor signal corresponding to the at least one environmental characteristic to a network system. The communication interface of each location tag is configured to transmit the sensor signal at a pre-determined transmission interval.

In accordance with an aspect of this disclosure, there is provided a method for monitoring a plurality of assets using a plurality of location tags. Each location tag is positioned at a corresponding asset. The method includes measuring, at each location tag, at least one environmental characteristic at a location of the corresponding location tag; and transmitting by, each location tag, a sensor signal corresponding to the at least one environmental characteristic to a network system. The sensor signal is transmitted at a pre-determined transmission interval.

In accordance with an aspect of this disclosure, there is provided a system for monitoring a plurality of assets. The system includes a plurality of location tags positioned at or adjacent to an asset, and the asset is a movable asset. Each of the plurality of location tags comprises at least one environmental sensor configured to determine at least one environmental characteristic at a location of the corresponding location tag. The movable asset comprises a location sensor to determine a position of the movable asset as the position of the movable asset changes while in operation. The location sensor transmits a location signal corresponding to the position of the movable asset to a network system, and each of the plurality of location tags comprises a communication interface configured to transmit a sensor signal corresponding to the at least one environmental characteristic to the network system, where the communication interface of each location tag is configured to transmit the sensor signal at a pre-determined transmission interval.

In accordance with an aspect of this disclosure, there is provided a method for monitoring a plurality of assets using a plurality of location tags, where each location tag is positioned at or adjacent to an asset, and where the asset is a movable asset. The method includes determining, at each location tag, at least one environmental characteristic at a location of the corresponding location tag; determining, using a location sensor comprised within the movable asset, a position of the movable asset as the position of the movable asset changes while in operation; transmitting, using the location sensor, a location signal corresponding to the position of the movable asset to a network system; and transmitting, using a communication interface comprised within each location tag, a sensor signal corresponding to the at least one environmental characteristic to the network system, where the sensor signal is transmitted at a pre-determined transmission interval.

In accordance with an aspect of this disclosure, there is provided a system for monitoring a plurality of assets. The plurality of assets includes a conveyor system. The system includes a plurality of location tags. At least a subset of the location tags is positioned at a fixed position along the conveyor system. At least one location tag is moveable with respect to the conveyor system such that the distance between the at least one location tag and the subset of the location tags is changeable. Each location tag includes at least one environmental sensor configured to measure at least one environmental characteristic at the location of the corresponding location tag. Each location tag includes a communication interface configured to transmit a sensor signal corresponding to the at least one environmental characteristic to a network system. The communication interface of each location tag positioned along the conveyor system is configured to transmit at least one information signal to the at least one location tag. A position of the at least one location tag is determined based on a signal strength of the corresponding information signal. The communication interface of each location tag is configured to transmit the sensor signal at a pre-determined transmission interval.

In accordance with an aspect of this disclosure, there is provided a method for monitoring a plurality of assets using a plurality of location tags. The plurality of assets includes a conveyor system. At least a subset of the location tags is positioned at a fixed position along the conveyor system. At least one location tag is moveable with respect to the conveyor system such that the distance between the at least one location tag and the subset of the location tags is changeable. The method includes measuring, at each location tag, at least one environmental characteristic at the location of the tag; transmitting, at each location tag positioned along the conveyor system, a sensor signal corresponding to the at least one environmental characteristic to a network system; and transmitting, at each location tag, at least one information signal to the mobile receiver. A position of the at least one location tag is determined based on a signal strength of the corresponding information signal and the sensor signal is transmitted at a pre-determined transmission interval.

BRIEF DESCRIPTION OF THE DRAWINGS

Several embodiments will be described in detail with reference to the drawings, in which:

FIG. 4 is an exploded view of the location tag shown in FIG. 3;

Figure 1:
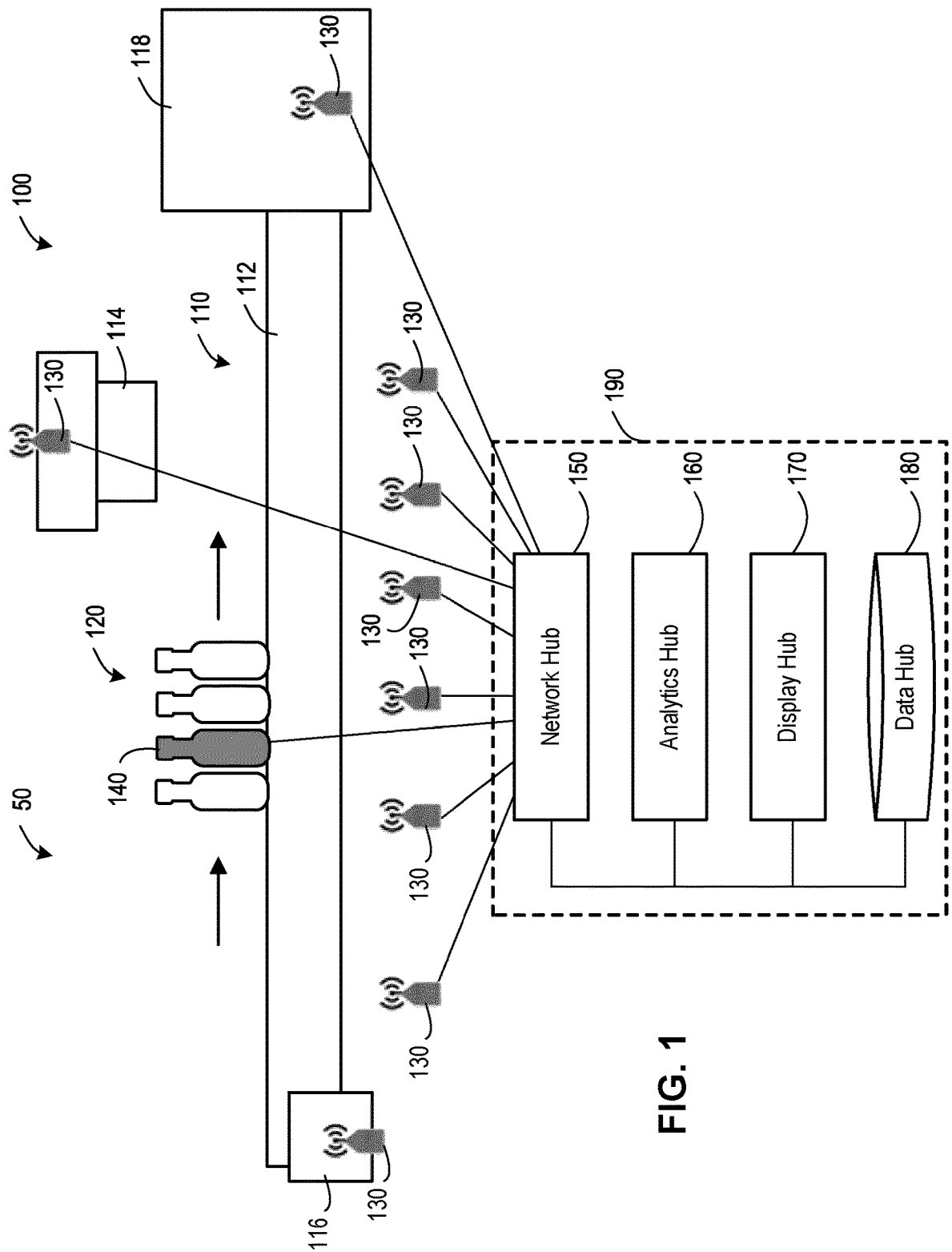
FIG. 1 is a block diagram of an example system for monitoring a plurality of assets, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Referring now to FIG. 1, there is shown an example system 100 for monitoring a plurality of assets. As shown, the monitoring system 100 can include a plurality of location tags 130, a mobile receiver 140, and a network system 190. The monitoring system 100 is generally operable to track the location of the mobile receiver 140 and measure environmental conditions at various locations. Data collected by the mobile receiver 140 can be correlated with the location of the mobile receiver 140 and the environmental conditions.

In the illustrated example, the monitoring system 100 is implemented within a manufacturing plant 50. It should be appreciated that, in other embodiments, the monitoring system 100 can be implemented in other environments and configurations, for example, as described herein with regard to FIGS. 11 and 12.

The manufacturing plant 50 can be any type of industrial setting for processing, transporting, and/or producing various articles 120, such as a factory, warehouse, or production facility. The plurality of assets in the manufacturing plant 50 can include various machines, tools, equipment, or other apparatuses, depending on the manufacturing plant 50. In various embodiments, the plurality of assets can include moveable assets, fixed assets or a combination of both. Moveable assets are assets that can move from one place to another, either in a continuous or a discreet motion, while in operation. A fixed asset is an asset that is intended to be at a fixed location while in operation.

As shown, the manufacturing plant 50 includes a manufacturing line 110, which can include sets of sequential operations related to various processes for the articles 120, such as a manufacturing process, packaging process, assembly process, etc. In the illustrated example, the manufacturing plant 50 is a bottling facility, the articles 120 are bottles, and the plurality of assets includes the conveyor system 112 (including the conveyor motor 116), a filling machine 114, and a labeling machine 118. The filling machine 114 is used for filling the bottles 120 and a labeling machine 118 is used for labeling the bottles 120. As shown, the manufacturing line 110 can include a conveyor system 112 configured to receive one or more items or articles 120, and to convey or transport them forward along the manufacturing line 110 to the various processes. The conveyor system 112 may include a conveyor belt, a robotic arm, a starwheel device, etc. Although the conveyor system 112 in the illustrated example is shown as linear and having a uniform width, it should be appreciated that the conveyor system 112 can have any suitable configuration. For example, the conveyor system 112 may include one or more portions having varying width, or one or more curved or winding sections. In some embodiments, the conveyor system 112 may include one or more split or branched segments.

The articles 120 transported by the conveyor system 112 may be subject to forces resulting from pressure exerted by other articles 120 on the conveyor system 112, pressure exerted by components of the conveyor system 112 or other components of the manufacturing line 110, effects of movement of the articles 120 on the conveyor system 112, and the like. Such forces may result in breakage, scuffing, abrasion, and other defects in the articles 120. For instance, in the illustrated example, the bottles may experience varying pressure forces, motion, and orientations while being conveyed. Manufacturing line operators may be interested in increasing efficiency and reducing production costs by reducing certain types of stresses and strains. For example, repeated strains on articles 120 through the manufacturing line 110 can lead to damaged articles 120 and reduce product production yield.

The mobile receiver 140 can have the same form factor as an article 120 and can be used to measure pressures or forces typically experienced by the articles 120. For example, the mobile receiver 140 may be configured to have the same or similar size, weight, dimension, and/or other physical characteristics as the article 120. In some cases, the mobile receiver 140 may be a replica or facsimile of the article 120. For instance, in the illustrated example, the mobile receiver 140 has the same size and shape as the actual bottles 120. As another example, FIGS. 13A-D show an example mobile receiver 140 that has the same shape and size as a vial. In the illustrated example, the mobile receiver 140 includes a power switch and charging port 142 and a charging indicator 144. As shown, the mobile receiver 140 can house various electronics therein. In the illustrated example, mobile receiver 140 includes various environmental sensors 146, a communication interface 148, and a power regulator 149. The mobile receiver 140 can be transported through the manufacturing line 110 by the conveyor system 112 along with the articles 120.

The mobile receiver 140 can include various sensors for measuring pressure, force, impact, and/orientation. For example, the mobile receiver 140 may include one or more pressure sensors, accelerometers, gyroscopes, and/or magnetometers, which may be disposed within or on the exterior of the mobile receiver 140. In this manner, the mobile receiver 140 can detect the various conditions experienced by the actual articles 120. The data can be stored on the mobile receiver 140 and/or transmitted to the network system 190 for storage thereon.

The data measured by the mobile receiver 140 can be associated with various locations, assets, and/or environmental conditions in the manufacturing plant 50 based on the tracked position of the mobile receiver 140. This may allow for the identification of sections in the manufacturing plant 50 that are potentially problematic. For example, potentially problematic regions along a manufacturing line 110 may include regions where articles 120 experience greater than tolerable external forces that may lead to damaged articles 120. Knowledge of potentially problematic regions may enable a manufacturing line operator to proactively remedy problems even before articles 120 are placed on the conveyor system 112. This may contribute to increased lifetime of the articles 120 in the manufacturing line 110, reduced wastage, reduced downtime, and/or improved efficiency.

Although only one mobile receiver 140 is illustrated in FIG. 1, any number of mobile receivers 140 may be transported through the manufacturing line 110 or the manufacturing plant 50 generally. In some embodiments, two or more mobile receivers 140 may be simultaneously used. For example, at a given point in time, a first mobile receiver 140 may be traversing a bottle filling portion 114 of the manufacturing line 110, and a second mobile receiver 140 may be traversing in a bottle labeling portion 118 of the manufacturing line 110. As the production process continues, the first and second mobile receiver 140 may continue along to successive portions of the manufacturing line 110. In other embodiments, the first mobile receiver 140 may be permanently assigned to gather data, for example, in the bottle filling portion 114 of the manufacturing line 110 and the second mobile receiver 140 may be permanently assigned to gather data in the bottle labeling portion 118 of the manufacturing line 110. In some cases, the mobile receiver 140 can be manually moved through the manufacturing plant 50 by a manufacturing line operator.

The location tags 130 can be positioned at various locations in the manufacturing plant 50 to monitor environmental conditions and may be used to determine the location of the mobile receiver 140. In general, there can be any number of location tags 130, and each location tag 130 can be positioned at any location in the manufacturing plant 50. In various embodiments, location tags 130 can be positioned at or adjacent to one or more assets in the manufacturing plant 50 so that the location tags 130 can monitor environmental conditions at the locations of the location tags. In various embodiments, the location tags 130 monitor the environmental conditions at the location of the assets. For instance, in the illustrated example, location tags 130 are disposed at the filing machine 114, the conveyor motor 116, the labeling machine 118, and along the conveyor system 112. In general, the location tags 130 can be disposed at any assets in the facility 50, including warmers, seamers, packagers, etc. (not shown). In some cases, location tags 130 can be disposed at locations remote from the assets, such as on a wall or other structure of the manufacturing plant 50. The location tags 130 can be disposed at fixed locations or variable locations. For example, one or more location tags 130 may be fixed to one or more moveable assets that change location over time. In various cases, one or more location tags 130 may be fixed to the mobile receiver 140.

In some embodiments, a subset of the location tags 130 can be positioned at fixed positions along the conveyor system 112. For example, the location tags 130 may be placed on rails or other structures or along the conveyor system 112. The location tags 130 may be located at the entrance or exit of equipment of interest, and/or other specific areas of interest, along the conveyor system 112, or otherwise in the manufacturing line 110. In some cases, the location tags 130 may be placed in close proximity to other adjacent location tags 130 and continuously placed along the length of the conveyor system 112 to achieve higher resolution and more accurate results from the methods described herein. The resolution and accuracy may also be increased by placing the location tags 130 in close proximity to each other. In some embodiments, the location tags 130 can be positioned equidistant from adjacent location tags 130. In other words, the distance between a first location tag 130 and a second location tag 130 may be the same as the distance between the second location tag 130 and a third location tag 130. In other embodiments, the location tags 130 may not be equidistant from each other. For example, the location tags 130 may only be positioned at the beginning and at the end of identifiable regions of the manufacturing line 110. Location tags 130 may be positioned in very close proximity to an adjacent location tag 130 or may be positioned sparsely throughout the manufacturing line 110. In some cases, the location tags 130 may be positioned at fixed and known locations of a manufacturing line 110 as position markers or guideposts.

In some embodiments, a subset of the location tags 130 can be positioned at one or more other assets in the manufacturing plant 50. That is, one or more location tags 130 may be positioned at locations other than along the conveying system 112. For instance, in the illustrated example, a first location tag 130 is positioned at the filling machine 114 and a second location tag 130 is positioned at the labeling machine 118.

Each location tag 130 can measure environmental characteristics associated with the location of the location tag 130. The environmental characteristics can be any conditions, attributes, or other measurable aspects associated with the environment or surroundings of the location tag 130. For example, the environmental characteristics may include vibration, shock, orientation, light, sound, other atmospheric characteristics. In some cases, one or more environmental characteristics can correspond to a particular asset, when the location tag 130 is disposed at the asset. In various embodiments, the environmental characteristics can be measured in accordance with one or more standards. For example, vibration characteristics may be measured in accordance with one or more ISO standards, such as ISO 20816-1:2016, ISO 20816-2:2017, ISO/CD 20816-3.2, ISO 20816-4:2018, ISO 20816-5:2018, ISO 20816-8:2018, ISO 20816-9:2020, ISO/AWI 20816-10, ISO 17359:2018, ISO 13372:2012, ISO 13381-1:2015, ISO 13373-1:2002, ISO 13373-2:2016, ISO 13373-5:2020, ISO 13373-9:2017, ISO 18129:2015, ISO 18436-2:2014, ISO 14830-1:2019, ISO 10816-3:2009, and/or ISO 10816-6:1995.

The environmental conditions can be used to evaluate the health of the corresponding assets or the facility 50 more generally. For example, air conditions (e.g., temperature, humidity, air pressure, air quality, etc.) may be monitored to determine whether they contribute to foaming during the process of canning a beverage. As another example, the surface temperature of an asset may be monitored to determine whether the asset is under duress or likely to fail, for instance, when the asset is under high temperature conditions. As a further example, the presence of toxic or explosive gases may be monitored to detect hazardous conditions in the facility 50 which may cause property damage, injury, or death.

Each location tag 130 can include one or more environmental sensors for measuring the environmental characteristics. Various sensors can be used to measure different environmental characteristics, as shown in FIGS. 2-5. In some cases, each location tag 130 can have the same environmental sensors. In other cases, the location tags 130 can have different sets of environmental sensors.

In some cases, the environmental characteristics measured by the environmental sensors can be stored locally at the location tags 130 as data. Additionally, or alternatively, the location tags 130 can transmit the environmental characteristics as sensor signals to the network system 190 for storage thereon.

The environmental sensors can measure the environmental characteristics at predefined times or intervals. For example, a temperature sensor may generate a temperature reading a predetermined interval of time, such as, for example, every 30 seconds or every 45 seconds etc. Each environmental sensor can have the same or different sensing intervals. In some cases, the sensing interval associated with each location tag can be changed over time, such as the sensing interval can be changed based on seasons, months of the year, other predetermined factors etc.

In some other cases, the location tags 130 can be controlled to adjust or modify the sensing intervals based on various factors as discussed herein. For example, the sensing interval can be modified to increase or decrease temporal data resolution. The sensing interval can be adjusted to optimize the power consumption and battery life of the location tags 130. In some cases, the sensing interval can be adjusted in response to one or more trigger events associated with previous sensor measurements. For example, the environmental sensors can be initially read based on a first sensing interval. One or more trigger events can be detected based on the measured environmental characteristics exceeding a predetermined threshold, and the sensing interval can be adjusted in response to the trigger events. In some cases, the trigger events may correspond to abnormalities or unexpected environmental conditions, and the sensing interval may be decreased to capture additional data. This results in more frequent measurements being taken by the location tags 130. In other cases, the trigger events may correspond to normal or typical environmental conditions, and the sensing interval may be increased to reduce power consumption and preserve battery life.

In some cases, the detection of one type of environmental characteristic exceeding a predetermined threshold can trigger the measurement of one or more other environmental characteristics. For example, the detection of the presence of light (e.g., indicating that the facility is active) may trigger the collection of vibration data. The trigger events may be detected by the location tag 130 or the network system 190. In some cases, a trigger event detected by the location tag 130 may cause the location tag 130 to transmit an alert to the network system 190. In other cases, a trigger event detected by the network system 190 may cause the network system 190 to transmit an alert to an external system. For example, the trigger events may correspond to dangerous or hazardous environmental conditions and the alerts may serve as a warning or alarm.

In some cases, the sensor signals can include raw sensor data. The raw sensor data can include unprocessed measurements received from the environmental sensors. For example, for a vibration sensor, such as an accelerometer, or an ultrasound sensor, the sensor signals may include a time series of vibration measurements, such as a time series of acceleration measurements or a time series of ultrasound measurements. Additionally, or alternatively, the sensor signals can include processed sensor data. The processed sensor data can include sensor measurements that have been processed in some manner. For instance, continuing with the example above, the sensor signals may include a frequency series of vibration measurements, such as a frequency series of acceleration measurements, or a frequency series of ultrasound measurements, determined based on the time series of vibration measurements.

The location tags 130 can perform various processing to generate processed sensor data from raw sensor data or previously processed sensor data. For example, continuing with the example of a vibration sensor, the location tag 130 can perform a Fourier transform to convert vibration data in the time domain into the frequency domain. In some embodiments, the processing can include determining one or more events in the sensor data by, for example, comparing sensor data to one or more predetermined thresholds. For instance, continuing with the example of a vibration sensor, the location tag 130 may determine a vibration event when the magnitude of a vibration measurement exceeds a predetermined vibration magnitude threshold, or if the frequency of vibration measurement is within a predetermined frequency band.

In some embodiments, the processing of raw sensor data can be executed at the network system 190. For example, raw sensor data can be transmitted as sensor signals to the network system 190. The network system 190 can then perform processing in a similar manner as the location tags 130. For example, the network system 190 can detect particular measurement or trigger events and perform various actions in response to the trigger events.

In some embodiments, other types of information can be measured by the location tag 130, and stored at the location tag 130 and/or transmitted to the network system 190 for storage thereon. For example, the location tag 130 may measure various diagnostic information related to the location tag 130 itself. For instance, the diagnostic information may include data associated with the performance of the various components of the location tag 130, such as power consumption, component malfunction/failure, etc.

The sensor signals can be transmitted by the location tags 130 at a predetermined transmission interval. For example, the sensor signals may be transmitted to the network system 190 every 30 seconds. The transmission interval for the sensor signals can be adjusted or modified by the location tag 130 and/or the network system 190. For example, in some embodiments, the transmission interval for the sensor signals can be adjusted to change the delay between when the environmental characteristics are measured and when they are received at the network system 190. Decreasing the transmission interval for the sensor signals can provide a more "real-time" view of the environmental conditions at the network system 190. However, decreasing the transmission interval can also increase the power consumption and therefore decrease the battery life of the location tag 130.

In some embodiments the transmission interval for the sensor signals can be adjusted in response to detecting one or more trigger events. For example, the location tag 130 and/or the network system 190 can detect one or more trigger events when the measured environmental characteristics exceeds a predetermined threshold. In some cases, the trigger events may correspond to abnormalities or unexpected environmental conditions, and the transmission interval may be decreased to reduce delay in the accessibility of the sensor data. In other cases, the trigger events may correspond to normal or typical environmental conditions, and the transmission interval may be increased to reduce power consumption and preserve battery life.

In some cases, different types of sensor data can be transmitted at different transmission intervals. For example, vibration data may be transmitted at a smaller interval than temperature data. As another example, event data can be transmitted at a greater interval than the raw sensor data. For example, continuing with the example of a vibration sensor, vibration events can be transmitted at a transmission interval that is lower than the transmission interval for the raw vibration measurements.

In some embodiments, each location tag 130 can also transmit information signals to the mobile receiver 140, which can be used to determine the position of the mobile receiver 140. The information signals can generally include any information. In some embodiments, the information signals may include a unique identifier for the location tag 130. The unique identifier is specific to the location tag 130 and identifies the location tag 130 from which the information signal originates. The unique identifier may be in the form of a MAC address, a location tag serial number, a location tag name, or any other identifier that uniquely identifies the location tag 130 from which the information signal originates. In other embodiments, the information signals may include battery or power level information specific to the location tag 130. The battery or power level information may be transmitted to a mobile receiver 140 to provide an indication that a location tag 130 may require some service, such as, for example, battery recharge, battery replacement, other services for non-battery source of power etc.

In operation, the mobile receiver 140 can move with respect to the conveying system 112 such that the distance between the mobile receiver 140 the location tags 130 is continuously changing. For instance, in the illustrated example, the mobile receiver 140 is moved along the conveyor system 112 and the manufacturing line 110. As the mobile receiver 140 moves through the manufacturing plant 50, the signal strength of the information signals received by the mobile receiver 140 changes as the distance between the mobile receiver 140 and the location tags 130 changes. For instance, in the illustrated example, as the mobile receiver 140 advances in the manufacturing line 110, the distance between the mobile receiver 140 and the subset of location tags 130 positioned along the manufacturing line 110 is continuously changing, and therefore the signal strength of the information signals received by the mobile receiver 140 is also continuously changing. The position of the mobile receiver 140 can be determined based on the signal strength of the information signals received by the mobile receiver 140.

Figure 9:
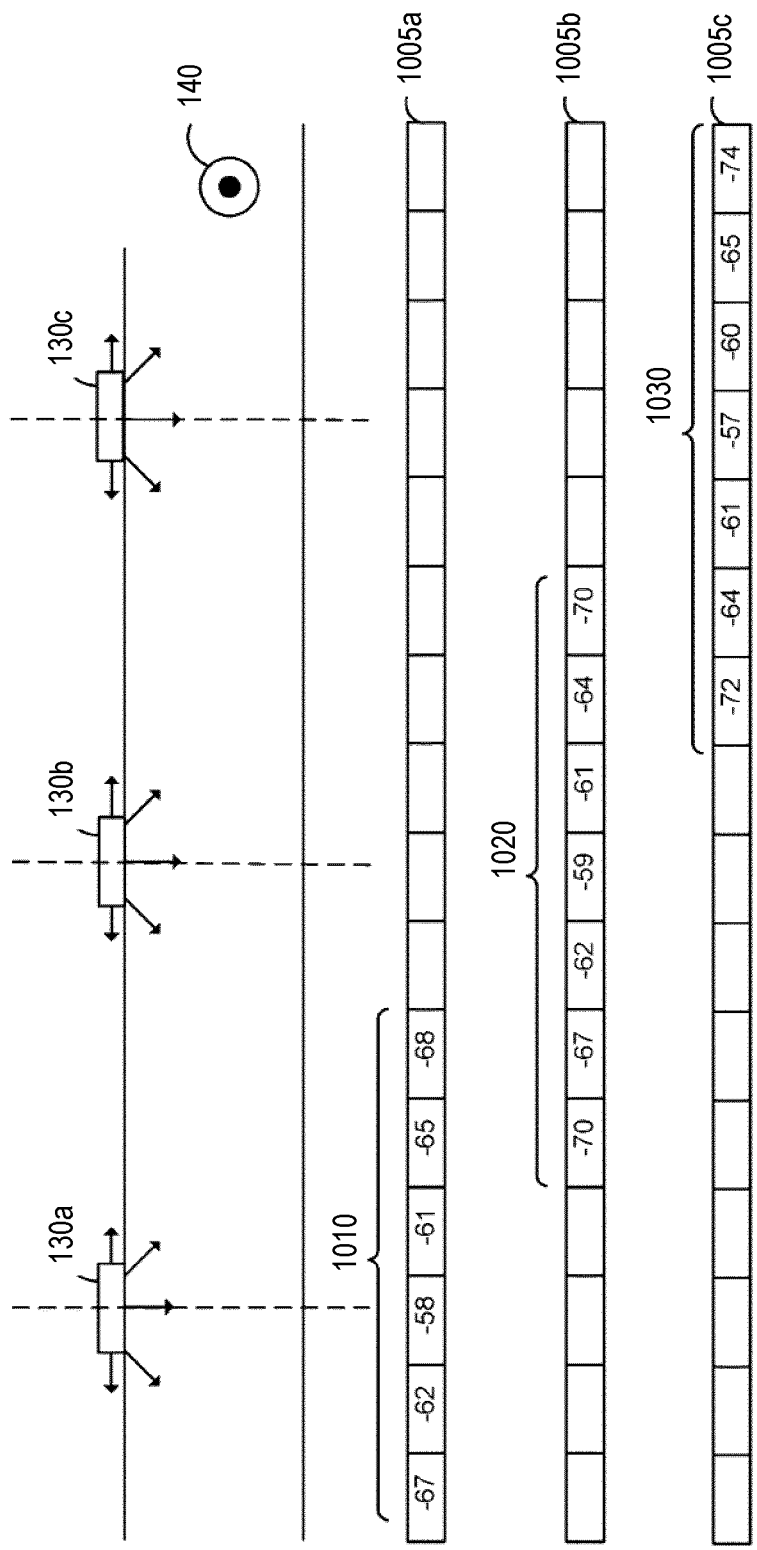
FIG. 9 is a schematic diagram illustrating an example operation of a monitoring system and corresponding recorded data, in accordance with an embodiment.

In some embodiments, the position of the mobile receiver 140 can be determined based on locating local maximums within a plurality of recorded signal strengths. For example, referring to FIG. 9, there is shown recorded signal strengths 1005a, 1005b, 1000c, as the mobile receiver 140 is moving past location tags 130 along the conveyor system 112. These signal strength values may be recorded at the mobile receiver 140 or the network system 190 or both. Each of the recorded signal strength arrays 1005a, 1005b, 1005c corresponds to a specific location tag 130. For example, the signal strength array 1005a corresponds to the signal strengths of information signals received by the mobile receiver 140 as the mobile receiver 140 approaches, passes, and traverses away from the location tag 130a. When the signal strengths of information signals are too low to be detected by the mobile receiver 140, no values are recorded in the signal strength array 1005a. But when the signal strengths of information signals are high enough to be detected by the mobile receiver 140, signal strength values 1010 are recorded.

Likewise, the signal strength array 1005b corresponds to the signal strengths of information signals received by the mobile receiver 140 as the mobile receiver 140 approaches, passes, and traverses away from the location tag 130b. Similarly, the signal strength array 1005c corresponds to the signal strengths of information signals received by the mobile receiver 140 as the mobile receiver 140 approaches, passes, and traverses away from the location tag 130c. When the signal strength of information signals received from location tag 130b are high enough to be detected by the mobile receiver 140, signal strength values 1020 are recorded. Similarly, when the signal strength of information signals received from location tag 130c are high enough to be detected by the mobile receiver 140, signal strength values 1030 are recorded. As illustrated, at any given time, the mobile receiver 140 may be receiving detectable information signals from more than one location tag 130.

As the mobile receiver 140 approaches a location tag 130, the signal strength of successively received information signals from the location tag 130 may strengthen. For example, as the mobile receiver 140 approaches a location tag 130b, mobile receiver 140 may receive an information signal with a signal strength of −70 dBm. As the mobile receiver 140 moves closer to the location tag 130b, the mobile receiver 140 may receive a successive information signal with a signal strength of −67 dBm. As the distance between the mobile receiver 140 and the location tag 130b further decreases, a further successive information signal may be received with a signal strengths of −62 dBm and −59 dBm, respectively. As the mobile receiver 140 subsequently moves past the location tag 130b, the signal strength of information signals may weaken. For example, as the mobile receiver 140 begins to move away from the location tag 130b, the signal strength of received information signals may be −61 dBm, −64 dBm, and −70 dBm, respectively. Accordingly, although the mobile receiver 140 may continuously receive information signals from the location tags 130, each received information signal may be received with a different signal strength.

A local maximum may be found after the mobile receiver 140 or the network system 190 have determined and recorded signal strengths of a plurality of information signals. A local maximum may be the largest signal strength in a sequence of signal strengths, such as signal strength arrays 1005a, 1005b, 1005c, received over a period of time. The local maximum can represent a minimum distance with respect to a location tag 130 transmitting an information signal. For example, in the illustrated example, the local maximum for signal strength array 1005a is −58 dBm, which corresponds to the position where the mobile receiver 140 is at a minimum distance to the location tag 130a, i.e. where the mobile receiver 140 is closest to the location tag 130a.

In other embodiments, the location of the mobile receiver 140 can be determined based on signal strength information and known distance information relating to where location tags 130 are placed within the manufacturing plant 50 (i.e., without locating local maximums). For example, referring to FIGS. 10A and 10B, there is shown recorded signal strength arrays 1105a, 1105b. The signal strength array 1105a corresponds to signal strengths of the successively received information signals from location tag 130a as the mobile receiver 140 approaches, passes, and subsequently moves away from the location tag 130a. Similarly, the signal strength array 1105b corresponds to signal strengths of the successively received information signals from location tag 130b as the mobile receiver 140 approaches, passes, and subsequently moves away from the location tag 130b.

Figure 10:
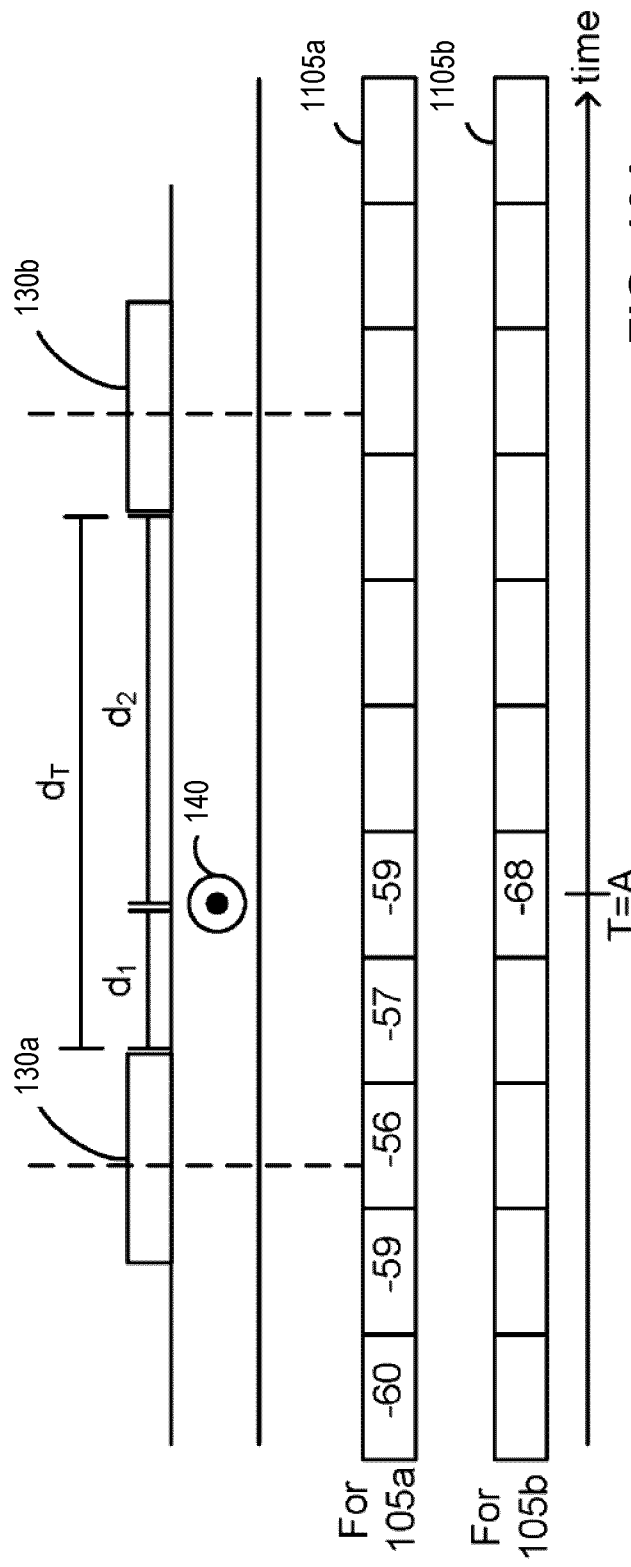
FIG. 10A is a schematic diagram illustrating another example operation of a monitoring system and corresponding recorded data, in accordance with an embodiment.
FIG. 10B is a lookup table for use in the operation of the monitoring system shown in FIG. 10A, in accordance with an embodiment.

As illustrated in FIG. 10B, a lookup table 1100b may be used to map or correlate a signal strength value to a distance value. For example, when a mobile receiver 140 receives an information signal from a location tag 130 with signal strength value of −62 dBm, the mobile receiver 140 may determine that the distance between the mobile receiver 140 and the location tag 130 from which the information signal was received is approximately 2 distance units. In various embodiments, the lookup table 1100b may correlate ranges of signal strengths to a discrete distance value. In other embodiments, the lookup table 1100b may correlate a discrete signal strength value to a discrete distance value. It will be understood that the implementation of the example lookup table 1100b should not be limited by described examples. In various embodiments, lookup table 1100b may be implemented to define high, low, and various intermediary signal strength thresholds and to correlate the signal strength thresholds to a distance value.

In various embodiments, a calibrated function may be used to correlate signal strength values to distance values. For example, the relationship between signal strength of an information signal received from a location tag 130 and distance between a location tag 130 and a mobile receiver 140 may be represented by a nonlinear curve or function. Without limiting the type of nonlinear functions that may be used, depending on the wireless communication method employed, exponential or polynomial functions are examples of nonlinear functions that may best approximate the relationship between signal strengths of information signals and distances between the mobile receiver 140 and location tags 130 transmitting the information signals. In other various embodiments, a set of calibration points may be used to correlate signal strength values to distance values. For example, a manufacturing line operator may setup a conveying system 112 and measure signal strength values of information signals at several known distances from a location tag 130. The mobile receiver 140 or the network system 190 may subsequently interpolate, from a set of calibration points, measured signal strength to estimate distance. Because location tags 130 are placed at fixed and known locations along the conveying system 112, a set of calibration points may be collected by a mobile receiver 140 over several traversals of the manufacturing line 110.

Referring back to FIG. 1, in other embodiments, the location tags 130 may not transmit information signals to the mobile receiver 140. For example, the mobile receiver 140 may include one or more location sensors which can be used to determine the position of the mobile receiver 140. For example, the mobile receiver 140 may employ various global positioning system (GPS) or indoor positioning system (IPS) technologies, including, for example, various Wi-Fi and Bluetooth positioning systems.

In various embodiments, various elements of the location tags 130 may be integrated into the mobile receiver 140. For example, the mobile receiver 140 may include any of the environmental sensors described herein with respect to the location tags 130. In some embodiments, one or more location tags 130 may be fixed to or integrated into the mobile receiver 140.

In some embodiments, the monitoring system 100 may not include a mobile receiver 140. Instead, one or more location tags 130 can provide some or all of the functionalities of the mobile receiver 140. In such embodiments, the monitoring system 100 may include one or more moveable location tags 130 that can be moved with respect to the conveyor system 112, one or more location tags 130 positioned along the conveyor system 112 and one or more location tags 130 corresponding to one or more other assets within the monitoring system 100.

In such embodiments, the one or more moveable location tags 130 can measure environmental characteristics as they are moved with respect to the conveyor system 112. The location of the one or more location tags 130 can be determined based on the signal strength of information signals received from the subset of location tags 130 positioned along the conveyor system 112. Additionally, or alternatively, the location of the one or more location tags 130 can be determined based on location sensors within the moveable location tags 130. The various environmental characteristics measured by the one or more moveable location tags 130 can then be correlated to the corresponding location of the one or more moveable location tags 130. Like the mobile receiver 140, the one or more moveable location tags 130 can have the same form factor as an article 120 and be transported through the manufacturing line 110 by the conveyor system 112 along with the articles 120.

The network system 190 can receive various data signals from the mobile receiver 140 and the location tags 130, analyze the received data, and display analyzed or raw data. In particular, the network system 190 can correlate the data received from the mobile receiver 140 with the data received from the location tags 130. In this manner, the network system 190 can correlate the various forces, impacts, spins, etc. detected by the mobile receiver 140 to specific locations, assets, and/or environmental conditions monitored by the location tags 130. The network system 190 can then perform various analysis to diagnose potential problems in the manufacturing plant 50. For example, the network system 190 may use the data to determine whether one or more assets require maintenance or otherwise needs to be repaired. The network system 190 can thus perform analysis on various assets without receiving data from the asset itself. In some cases, the network system 190 can also perform analysis to determine potential issues with the location tags 130. For example, the network system 190 may analyze the data received from the location tags 130 to determine configuration settings for the location tags 130 to reduce power consumption or to increase data resolution. In various embodiments, the network system 190 may use the data to train one or more machine learning or AI models to make predictions based on the data.

As shown, the network system 190 can include a network hub 150, an analytics hub 160, a display hub 170, and a data hub 180. The network hub 150 can generally receive data from or transmit data to the location tags 130 and/or the mobile receiver 140. The analytics hub 160 can generally perform various analysis on the received data. The display hub 170 can generally display graphics associated with the received data and/or analysis of the received data. The data hub 180 can generally store the received and/or analyzed data.

The network system 190 can be implemented using hardware or a combination of hardware and software. For example, the network system 190 may be implemented using an electronic tablet device, a personal computer, workstation, server, portable computer, mobile device, personal digital assistant, laptop, smart phone, WAP phone, or any combination of these. In various embodiments, the network system 190 can be provided by one or more computers distributed over a wide geographic area and connected via a network. The network system 190 can include a processor, a data storage, and a communication interface.

The processor can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the network system 190. The processor can include more than one processor with each processor being configured to perform different dedicated tasks. In the illustrated example, the processor can be implemented as part of the analytics hub 160.

The data storage can include RAM, ROM, one or more hard drives, one or more flash drives or some other suitable data storage elements such as disk drives. The storage component can store data collected from the location tags 130 and/or the mobile receiver 140. The data storage can also store instructions that can be executed by the processor to implement the various location tracking and asset monitoring methods described herein. For example, the instructions may cause the processor to determine the position of the mobile receiver 140 and/or correlate data received from the mobile receiver 140 to data received from the location tags 130. In the illustrated example, the data storage can be implemented as a part of the data hub 180.

The communication interface can include any interface that enables the network system 190 to communicate with various devices and other systems. The communication interface can include at least one of a serial port, a parallel port or a USB port, in some embodiments. The communication interface may also include an interface to a component via one or more of a Bluetooth, WIFI, Internet, Local Area Network (LAN), Ethernet, Firewire, modem, fiber, or digital subscriber line connection. Various combinations of these elements may be incorporated within the communication interface. The communication interface can allow the network system 190 to communicate with the location tags 130 and/or the mobile receiver 140. In the illustrated example, the communication interface can be implemented as a part of the network hub 150 and/or the display hub 170.

Although only a single network system 190 is shown in the illustrated example, it should be appreciated that there can be any number of network systems 190. Additional network systems 190 may provide redundancy and/or increased communication range to the location tags 130. For example, in some cases, the monitoring system 100 can include two or more network systems 190 and the location tags 130 may communicate with the nearest network system 190.

In some embodiments, the network system 190 can also transmit information signals to the mobile receiver 140 (i.e., in a similar manner as the location tags 130), which can be used to determine the location of the mobile receiver 140.

Figure 2:
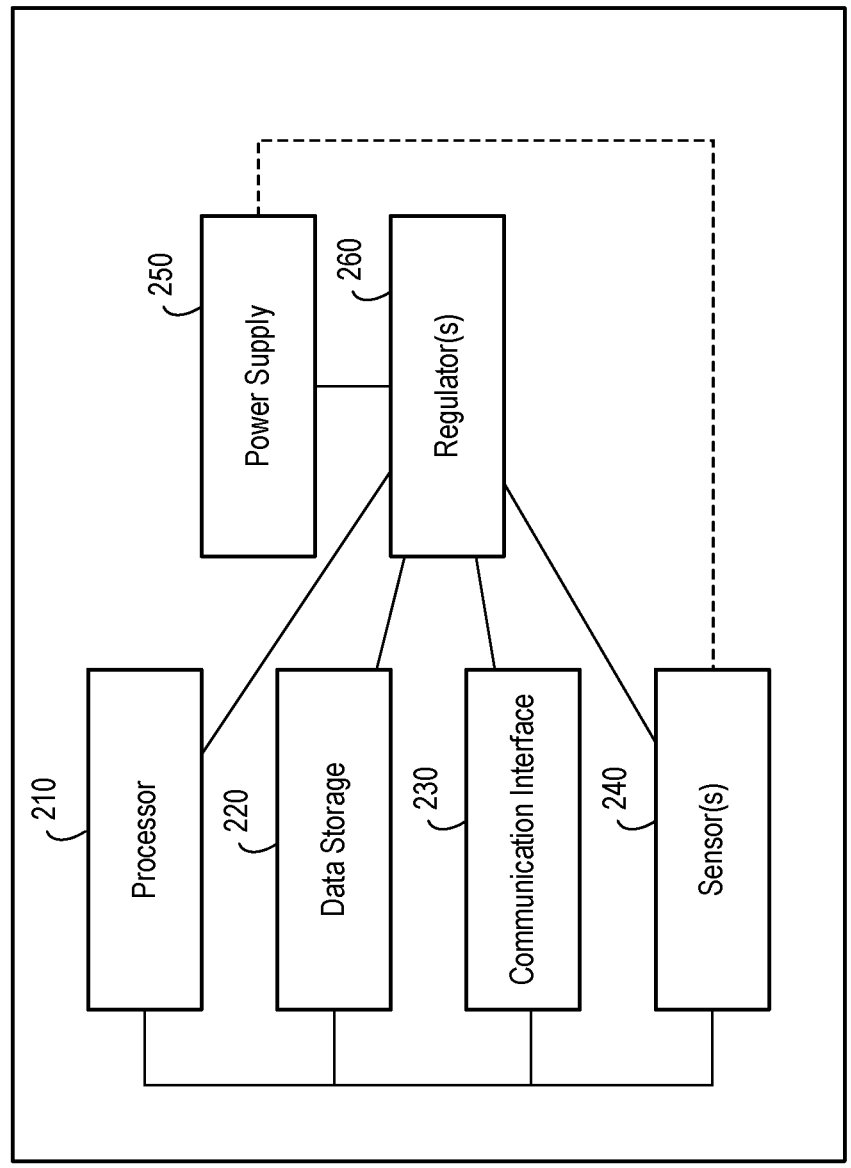
FIG. 2 is a block diagram of an example location tag for the monitoring system shown in FIG. 1, in accordance with an embodiment.

Referring now to FIG. 2, there is shown a block diagram of an example location tag 130 for a monitoring system 100. As shown, the location tag 130 can include a processor 210, a data storage 220, a communication interface 230, at least one environmental sensor 240, a power supply 250, and at least one regulator 260. The processor 210, the data storage 220, the communication interface 230, and the environmental sensors 240 can be coupled so that various data can be communicated therebetween. Each component may be combined into a fewer number of components or may be separated into further components.

The environmental sensors 240 can include various sensors for measuring environmental characteristics in the manufacturing plant 50. For example, the environmental sensors 240 can include various sensors for measuring shock, vibration, and/or orientation, such as one or more accelerometers, gyroscopes, or ultrasound sensors. The environmental sensors 240 can also include one or more atmospheric sensors. For instance, the atmospheric sensors may include one or more temperature sensors, humidity sensors, air pressure sensors, optical sensors, audio sensors, radiation sensors, and/or gas sensors. The temperature sensors can be ambient or contact temperature sensors. For example, the temperature sensors may measure the temperature of the air or the contact temperature of an object coupled to the environmental sensor 240. The optical sensors can measure various optical or light characteristics, including visible light, infrared light and/or ultraviolet light. The gas sensors can measure the concentration of particular gases, such as carbon dioxide ($CO_2$), hydrogen sulfide ($H_2S$), sulfur dioxide ($SO_2$), hydrogen ($H_2$), ammonia ($NH_3$), ethylene ($C_2H_4$), oxygen ($O_2$), benzene ($C_6H_6$), various volatile organic compounds (VOC), etc. In some cases, the gas sensors can measure the total concentration of volatile organic compounds (TVOC). In some cases, the gas sensors can measure an indoor air quality metric (IAQ). For example, the gas sensors may gas conditions that may cause death for inhalation, pose an explosion risk, pose a risk to product quality, and/or cause undesired odors. In various embodiments, the environmental sensors 240 can be low energy MEMS sensors.

The processor 210 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the location tag 130. The processor 210 can include more than one processor with each processor being configured to perform different dedicated tasks.

The data storage 220 can include RAM, ROM, one or more hard drives, one or more flash drives or some other suitable data storage elements such as disk drives. The data storage 220 can store various data collected from the environmental sensors 240. The data storage 220 can also store instructions that can be executed by the processor 210 to implement the various location tracking and asset monitoring methods described herein.

The communication interface 230 can include any interface that enables the location tag 130 to communicate with various devices and other systems. The communication interface 230 can include at least one of a serial port, a parallel port or a USB port, in some embodiments. The communication interface 230 may also include an interface to a component via one or more of a Bluetooth, WIFI, Internet, Local Area Network (LAN), Ethernet, Firewire, modem, fiber, or digital subscriber line connection. Various combinations of these elements may be incorporated within the communication interface 230. In various embodiments, the communication interface 230 can facilitate wireless communication between the location tag 130 and the mobile receiver 140 and/or the network system 190. Examples of wireless communication protocols that may be used include Bluetooth® 4.0 Low Energy, passive or active RFID, infrared light emission and detection, WiFi, radio frequency communication, or any other wireless transmission method. For example, the communication interface 230 may be used to transmit sensor signals and/or information signals. The communication interface 230 can transmit one or more information signals and/or sensor signals in a plurality of directions. In some cases, the communication interface 230 may transmit information signals and/or sensor signals with an omnidirectional antenna. In some other cases, the communication interface 230 may transmit information signals and/or sensor signals with one or more unidirectional antennas. The information signals and/or sensor signals may be transmitted at any frequency. The frequency may be fixed or variable.

The power supply 250 and regulators 260 can provide electrical power to the various components of the location tag 130. In some cases, the power supply 250 can be implemented using one or more energy storage devices that are local to the location tag 130, such as a battery or super capacitor. In other cases, the power supply 250 can receive power from an external power source, for example from a wire or cable. In some cases, the power supply 250 can include one or more energy harvesting devices for capturing electrical energy, such as kinetic energy, solar energy, magnetic energy, and/or thermal energy.

The regulators 260 can adjust the "raw" current or voltage from the power supply 250 to suitable levels for the various components of the location tag 130. In some cases, the location tag 130 can include more than one regulator 260 for supplying different current or voltage levels to different components. In some cases, one or more components of the location tag 130 can receive electrical power directly from the power supply 250. In some embodiments, some environmental sensors 240 may receive electrical power at a first power level directly from the power supply 250, whereas some other environmental sensors 240 may receive electrical power at a second power level different from the first power level from the regulator 260. In some embodiments, the processor 210 may receive a power level from the regulators 260 that is different than the power level received from any of the environmental sensors 240. In some cases, the regulators 260 can be controlled by or implemented as a part of the processor 210 to provide particular current or voltage levels to the various components.

In some embodiments, the location tag 130 includes one or more location sensors which can be used to determine the position of the location tag 130. For example, the location tag 130 may employ various global positioning system (GPS) or indoor positioning system (IPS) technologies, including, for example, various Wi-Fi and Bluetooth positioning systems.

Figure 3:
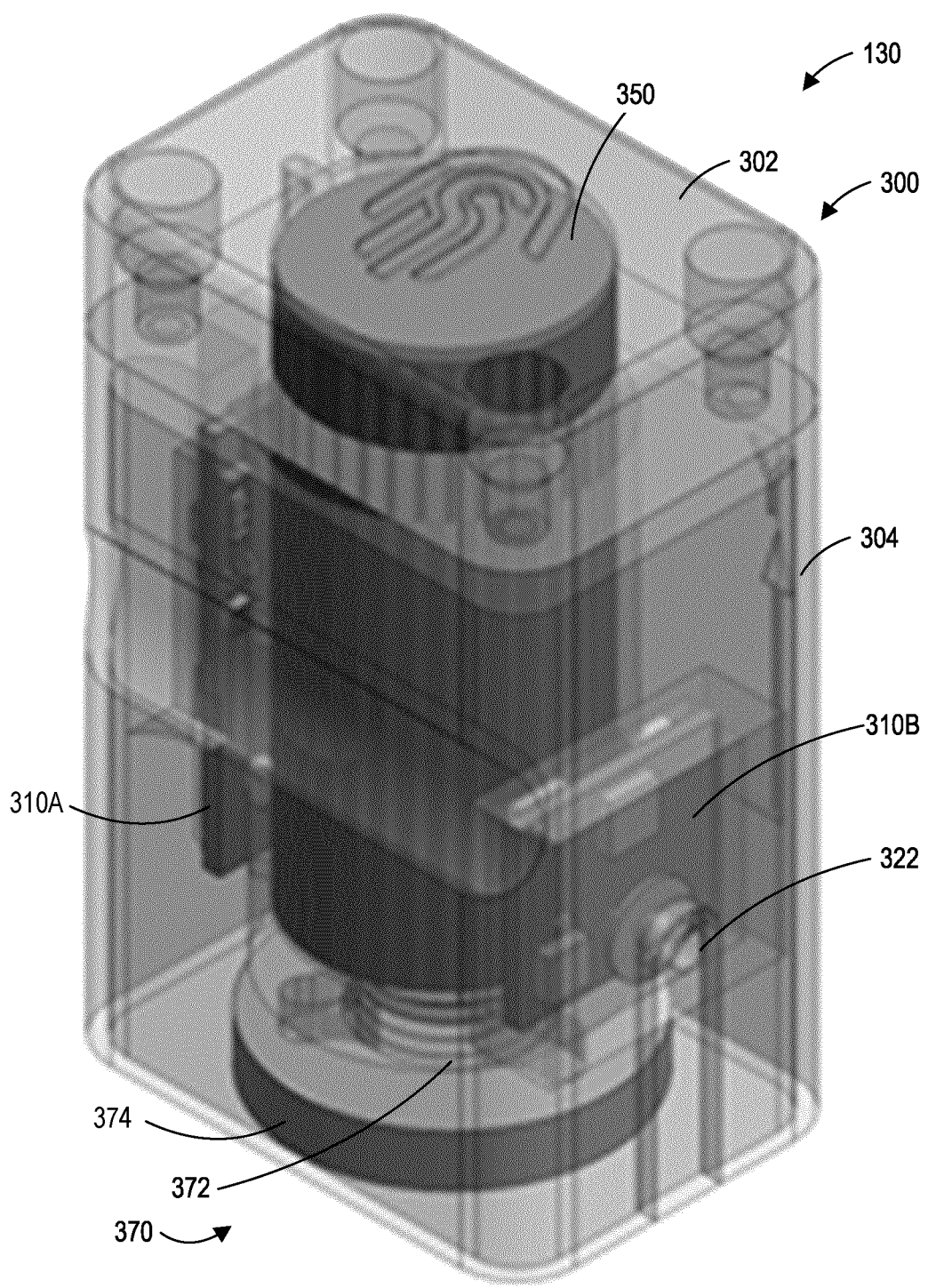
FIG. 3 is a perspective view of an example location tag, in accordance with an embodiment.

Referring now to FIGS. 3 and 4, there is shown a perspective view and an exploded view of an example location tag 130 for the monitoring system 100. As shown, the location tag 130 can include a housing 300, circuit boards 310A, 310B, battery 350, and attachment member 370.

The housing 300 can store each of the other components of the location tag 130 therein. The housing 300 generally encloses and protects the interior components of the location tag 130 from the surrounding environment. For example, the housing 300 can protect the interior components from dirt/dust, structural stress, physical, chemical, and/or radiational damage. The housing 300 can also enable easier handling of the location tag 130 by an operator, such as, for example, a manufacturing line operator. In the illustrated example, the housing 300 is formed by an upper housing 302 and a lower housing 304 for ease of assembly. However, it should be appreciated that, in other cases, the housing 300 may be a unitary piece, or formed by more than two pieces.

The housing 300 can be made of any suitable material, such as plastic, metal, etc. In some cases, the housing 300 can be formed using a rigid material to minimize internal vibration of the location tag 130, which can minimize noise when making vibration measurements. The housing 300 can also include various features to facilitate the attachment of the various interior components to the housing 300. For instance, in the illustrated example, the housing 300 includes a mounting fixture 306 for mounting the circuit board 310B. The mounting features can rigidly mount the components to minimize internal vibration. For example, the components can be rigidly mounted to the housing 300 so that the location tag 130 has a mounted natural frequency that is greater than the frequency of the vibrations typically measured by the location tag 130. In this configuration, the internal vibration of the location tag 130 will not affect measurements of the vibration of an asset, since the respective vibrations have different frequencies.

In some cases, the housing 300 can include one or more channels 322 for providing access to the exterior of the location tag 130. The one or more channels 322 can extend between one or more of the environmental sensors 240 and the exterior of the location tag 130. The channels 322 can provide one or more environmental sensors 240 access to the exterior environment adjacent the location tag 130 to allow for accurate sensing. For some environmental characteristics, such as some atmospheric characteristics (e.g., temperature, air pressure, humidity, etc.) it may be difficult or impossible to accurately measure the environmental characteristics without access to the exterior of the location tag 130. In various embodiments, one or more channels 322 can be sealed to prevent liquid from entering the channel 322. The channels 322 can be sealed in a manner which allows air or other gases to enter the channel 322, but not liquids. For example, the channel 322 may be sealed by a liquid impermeable membrane. As shown in the illustrated embodiment, the channels 322 may only provide access to a subset of the environmental sensors 240. For example, in the illustrated example, a channel 322 is formed in the housing 300 to provide environmental access to the atmospheric sensors on the secondary board 310B.

The attachment member 370 can be used to removably attach, couple, or fix the location tag 130 to other objects. For example, the attachment member 370 can be used to removably attach the location tag 130 to an asset, such as an asset in the manufacturing plant 50. As shown, the attachment member 370 can include a threaded insert 372 and/or a magnet 374. The threaded insert 372 can allow the location tag 130 to be fixed to a corresponding threaded fastener, such as a bolt or screw, which may be present on the exterior of one or more assets. The magnet 374 can allow the location tag 130 to be attached to a ferromagnetic surface, such as iron, nickel, cobalt, alloys thereof, etc., which may be present on the exterior of one or more assets. Although the magnet 374 and the threaded insert 372 are shown as two distinct components, in some cases, they can be implemented by a magnet having a threaded opening defined therein. In other embodiments, the attachment member 370 can be a more permanent coupling, such as an adhesive. The attachment member 370 can provide a rigid coupling of the location tag 130 to an asset such that vibrations are transmitted from the asset to the location tag 130. In some embodiments, the attachment member 370 is a mounting bracket or a plate that can be removably attached to a receiving member affixed to the asset. An example of such an attachment member 370 is a horseshoe mounting plate.

The battery 350 can operate as the power supply 250 and provide electrical power to the circuit boards 310A and 310B. In various embodiments, the battery 350 can be rechargeable such that it can be charged, discharged, and recharged. In other embodiments, the battery 350 can be a disposable or non-rechargeable battery. The battery 350 can be electrically coupled the circuit boards 310A and 310B by any suitable connector, such as by a wire or cable.

The circuit boards 310A and 310B can provide the various electronic components of the location tag 130, apart from the battery 350, such as the processor 210, the data storage 220, the communication interface 230, the environmental sensor(s) 240, and the regulator(s) 260. As shown, splitting the electronic components of the location tag 130 among two or more circuit boards can allow for individual components to be easily upgraded or replaced. The first and second circuit boards 310A and 310B can be connected using a cable 316 for electrical power and/or data communication. It should be appreciated that, in other embodiments, the location tag 130 may be implemented using a single circuit board. In some further embodiments, the location tag 130 may be implemented using more than two circuit boards.

Figure 5B:
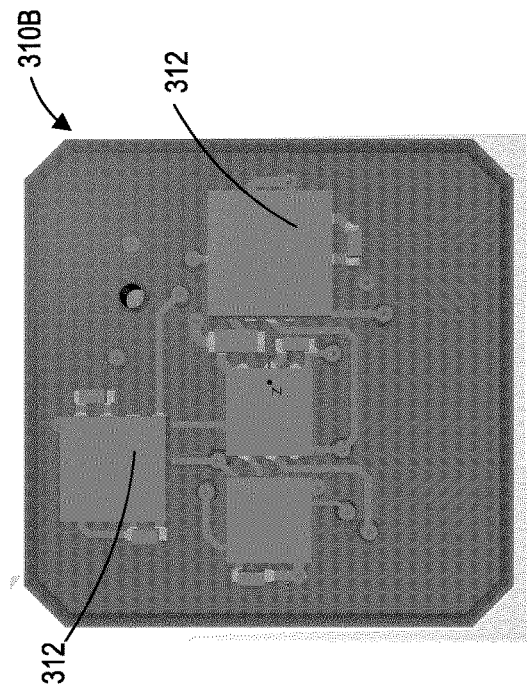
FIG. 5B is a top view of another example circuit board, in accordance with an embodiment.
Figure 5C:
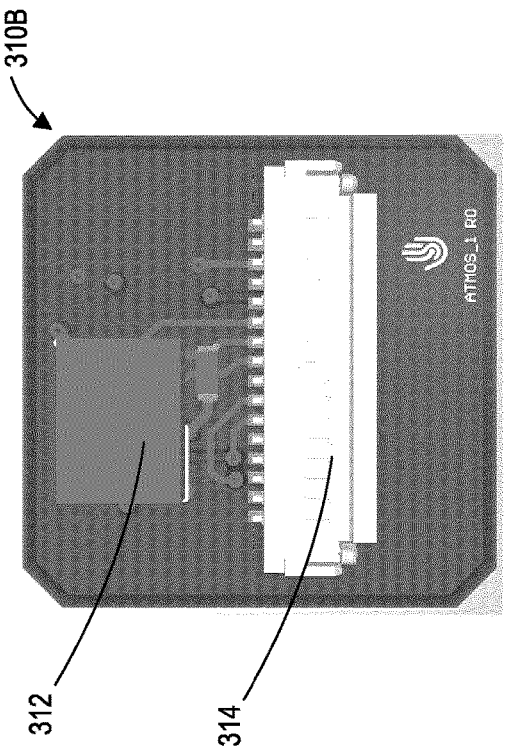
FIG. 5C is a bottom view of the circuit board shown in FIG. 5B.
Figure 5A:
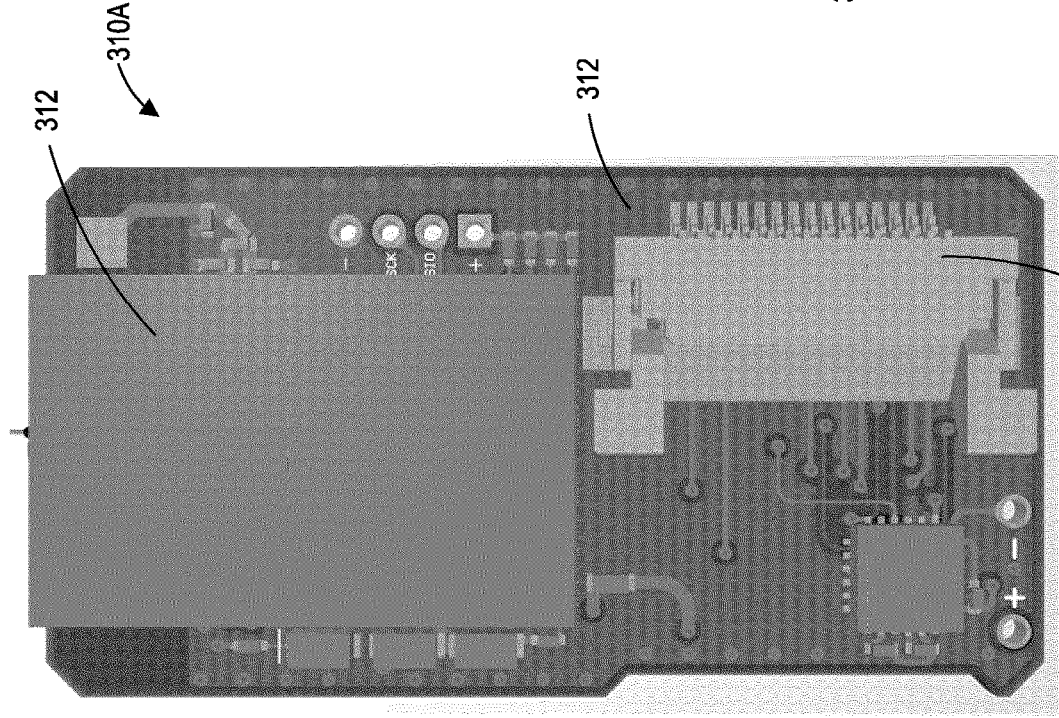
FIG. 5A is a top view of an example circuit board for the location tag shown in FIG. 3, in accordance with an embodiment.

Reference will now be made to FIGS. 5A, 5B, and 5C, which show the circuit boards 310A and 310B in greater detail. As shown, the circuit boards 310A and 310B can include various integrated circuit components 312 that can provide the various electronic components of the location tag 130, such as the processor 210, the data storage 220, the communication interface 230, the environmental sensors 240, and the regulators 260. The circuit boards 310A and 310B can also include various interfaces 314 for receiving electrical power and for data communication.

In some embodiments, the first circuit board 310A can serve as a primary board, and the second circuit board 310B can serve as a secondary board. The primary board 310A can provide most of the electronics for the location tag 130, and the secondary board 310B can provide one or more of the environmental sensors 240. For example, the processor 210, the data storage 220, the communication interface 230, and the regulators 260 can be located on primary board 310A and one or more environmental sensors 240 can be located on the secondary board 310B. This configuration can permit the environmental sensors on the secondary circuit board 310B to be isolated from the remaining electronics on the primary circuit board 310A. In this manner, the environmental sensors 240 on the secondary circuit board 310B can be provided with access to the environment adjacent the location tag 130, without necessarily exposing the primary circuit board 310A. Accordingly, this configuration can provide atmospheric sensors (e.g., temperature sensors, humidity sensors, air pressure sensors, light sensors, sound sensors, radiation sensors, gas sensors, etc.) with access to inputs to sense, while protecting the electronics on the primary board 310A. Moreover, the secondary board 310B, which may degrade faster over time due to exposure to environmental conditions, can be easily replaced, without replacing the primary board 310A.

In some embodiments, the primary board 310A can also include one or more environmental sensors 240. The environmental sensors 240 on the primary board 310A can include sensors that do not require direct access to the external environment of the location tag 130. For example, the primary board 310A may include various sensors for measuring shock, vibration, and/or orientation, such as one or more accelerometers, gyroscopes, or ultrasound sensors.

Figure 6:
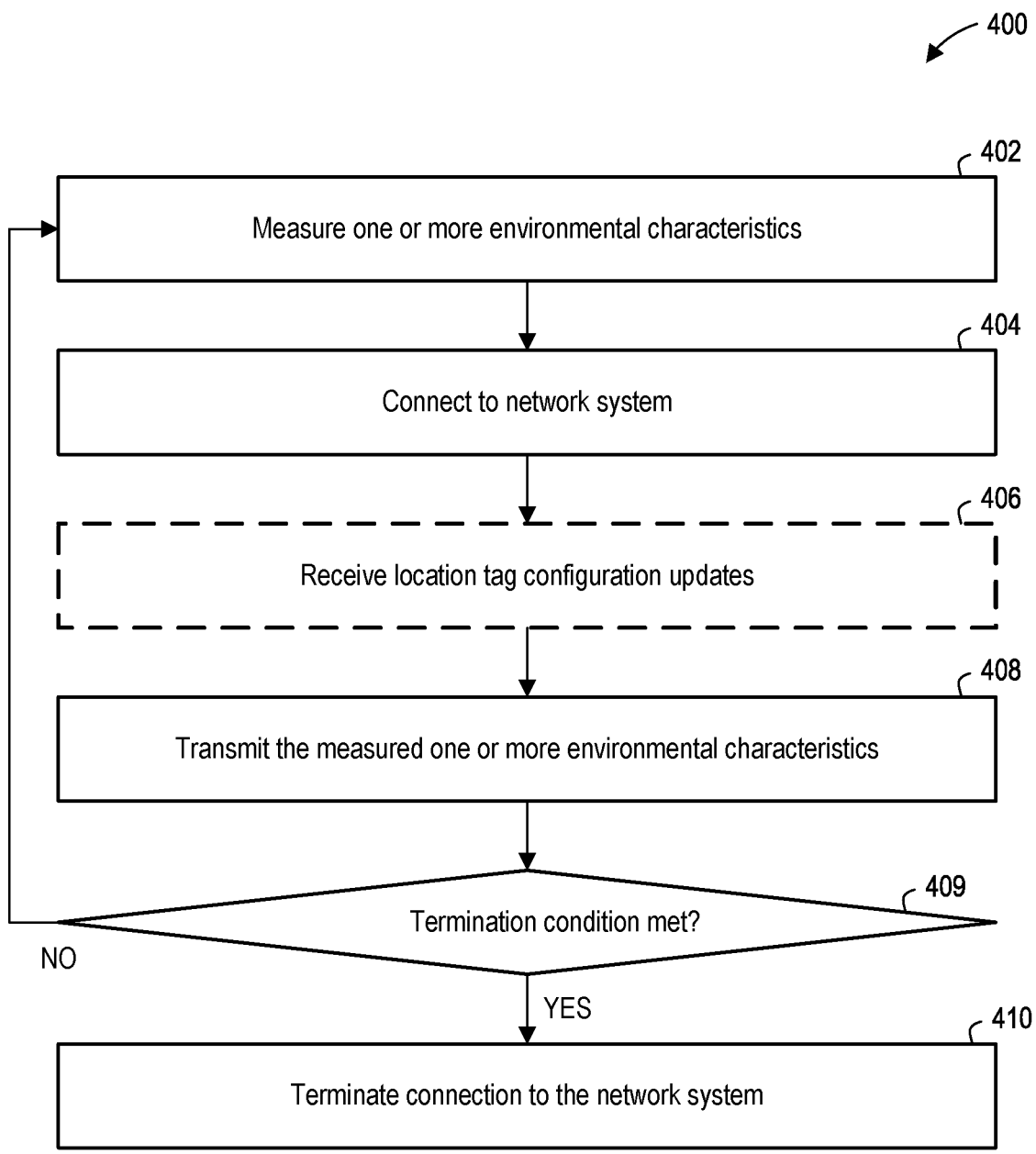
FIG. 6 is a flowchart of an example method of operating a monitoring system, in accordance with an embodiment.

Referring now to FIG. 6, there is shown an example method 400 of operating a monitoring system 100. For example, the monitoring method 600 can generally be implemented using the location tags 130 and the network system 190.

At 402, the location tags 130 can measure one or more environmental characteristics. For example, the environmental sensors 240 can measure various conditions, attributes or other aspects associated with the environment or surroundings of the location tag 130, such as, shock, vibration, orientation, temperature, humidity, air pressure, light, sound, radiation, and/or gas concentration.

At 404, the location tags 130 can connect to the network system 190. For example, the communication interface 230 can establish a connection with the network hub 150. The location tags 130 can establish the connection with the network system 190 to facilitate data communication therebetween. In some cases, the connection may be a wireless connection, such as Bluetooth® 4.0 Low Energy, passive or active RFID, infrared light emission and detection, WiFi, radio frequency communication, or any other wireless transmission method. In some cases, there may be more than one network system 190, and the location tags 130 can locate each network system 190 within the range of the location tags 130 and connect to the nearest network system 190.

At 406, optionally, the location tags 130 can receive configuration updates from the network system 190. The network system 190 can provide various firmware and software updates to the location tags 130. In some cases, the network system 190 may provide calibration settings to adjust the calibration of the environmental sensors 240. The network system 190 may also adjust the sensing interval or transmission interval of the location tag 130.

At 408, the location tag 130 can transmit the measured one or more environmental characteristics to the network system 190. The environmental characteristics can be transmitted as sensor signals across the established connection between the location tag 130 and the network system 190. In some cases, the location tag 130 may transmit one or more alerts to the network system 190.

At 409, the location tag 130 can determine whether a termination condition is met. If a termination condition is met, the method 400 can proceed to 410. If the termination condition is not met, the method 400 can proceed back to 402. In this manner, acts 402, 404, 406, 408, and 409 may be executed again or repeated indefinitely. Various termination conditions can be established. For example, the termination conditions may include an operator indicated termination, a detected malfunction in the location tag 130, or any other predetermined rules.

At 410, the location tag 130 can terminate the connection with the network system 190. For example, the location tag 130 may disconnect a wireless connection with the network device 190.

Figure 7:
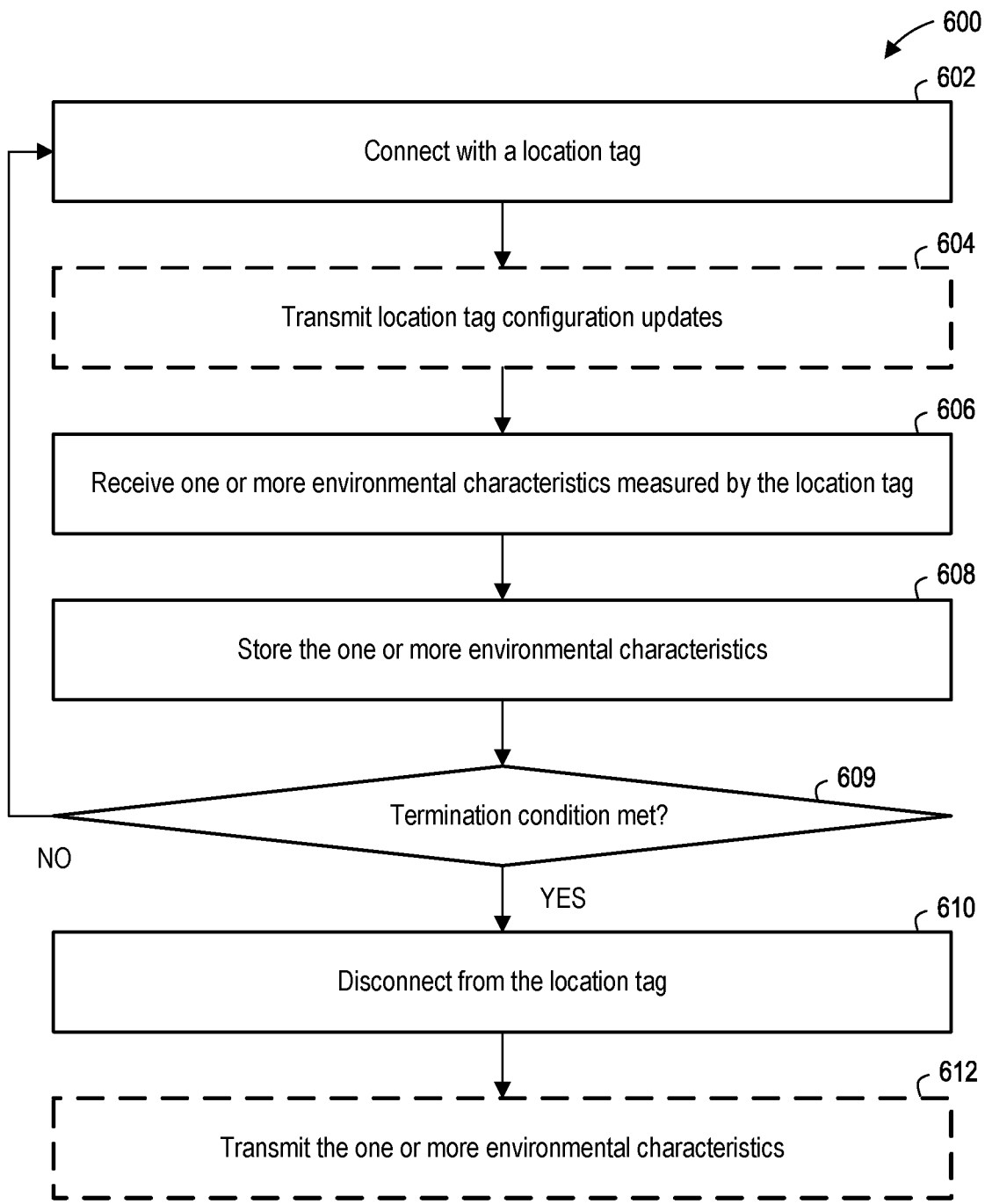
FIG. 7 is a flowchart of another example method of operating a monitoring system, in accordance with an embodiment.

Referring now to FIG. 7, there is shown an example method 600 of operating a monitoring system 100. The monitoring method 600 can generally be implemented using the location tags 130 and the network system 190.

At 602, the network system 190 can connect to a location tag 130. For example, the network hub 150 can establish a connection with the communication interface 230. The network system 190 can establish the connection with the location tag 130 to facilitate data communication therebetween. In some cases, the connection may be a wireless connection, such as Bluetooth® 4.0 Low Energy, passive or active RFID, infrared light emission and detection, WiFi, radio frequency communication, or any other wireless transmission method.

At 604, optionally, the network system 190 can transmit configuration updates the location tag 130. The network system 190 can provide various firmware and software updates to the location tags 130. In some cases, the network system 190 may provide calibration settings to adjust the calibration of the environmental sensors 240. The network system 190 may also adjust the sensing interval or transmission interval of the location tag 130.

At 606, the network system 190 can receive one or more environmental characteristics measured by the location tag 130. The environmental characteristics can be transmitted as sensor signals across the established connection between the location tag 130 and the network system 190. The environmental characteristics can be any conditions, attributes or other aspects associated with the environment or surroundings of the location tag 130, such as, shock, vibration, orientation, temperature, humidity, air pressure, light, sound, radiation, and/or gas concentration. In some cases, the network system 190 may receive alerts from the location tag 130.

At 608, the network system 190 can store the environmental characteristics. For example, the network system 190 can store the environmental characteristics in the data hub 180.

At 609, the network system 190 can determine whether a termination condition is met. If a termination condition is met, the method 600 can proceed to 610. If the termination condition is not met, the method 600 can proceed back to 602. In this manner, acts 602, 604, 606, 608, and 609 may be executed again or repeated indefinitely. Various termination conditions can be established. For example, the termination conditions may include an operator indicated termination, a detected malfunction in the location tag 130 or network system 190, or any other predetermined rules.

At 610, the network system 190 can terminate the connection with the location tag 130. For example, the network hub 150 may disconnect a wireless connection with the location tag 130.

At 612, optionally, the network system 190 can transmit the one or more measured environmental characteristics. The network system 190 can transmit the one or more measured environmental characteristics to one or more other systems. For example, the network system 190 may relay the information to an external server. The external server may have additional processing capacity to perform further analysis on the data. In some cases, act 612 may be performed prior to the network system 190 terminating the connection with the location tag 130 at 610.

As shown, subsequent to 610, acts 602, 604, 606, 608, 610, and 612 can be executed again or repeated indefinitely.

Figure 8:
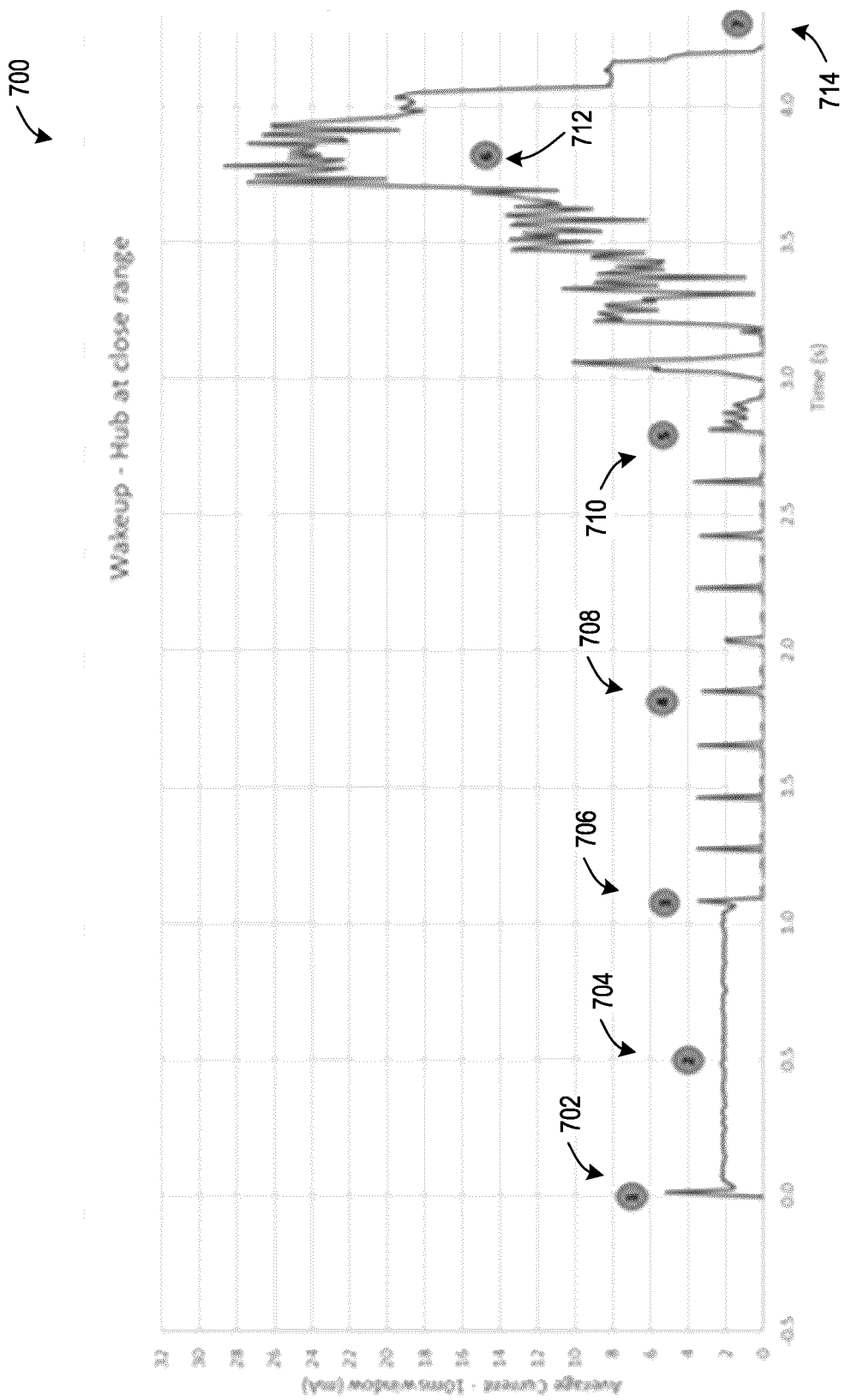
FIG. 8 is a graph illustrating an example power consumption profile of a location tag during operation, in accordance with an embodiment.

Referring now to FIG. 8, there is shown a graph 700 illustrating an example power consumption profile of a location tag 130 at various stages of a monitoring process. In the illustrated embodiment, the average current consumption is illustrated, which can be used as a proxy for power consumption.

At 702, the power profile of a location tag 130 at activation is illustrated. When the location tag 130 is activated, power consumption begins. In some cases, a sleep timer can be initiated upon the location tag 130 being activated. For example, a 30 second sleep timer can be initiated which automatically shuts down the location tag after 30 seconds.

At 704, the power profile of a location tag 130 while in operation is illustrated. The location tag 130 may be capturing shock, vibration, and/or orientation environmental characteristics at this power profile. The location tag 130 may measure these environmental characteristics using the environmental sensors 240 included on the primary board 230A.

At 706 and 708, the power profile of a location tag 130 searching for a network system 190 to connect with is illustrated. For example, the location tag 130 may be transmitting Bluetooth advertising at a power profile shown in 706, 708. In some cases, there may be more than one network system 190, and the location tag 130 can connect to the nearest network system 190 within the range of the location tag 130.

At 710, the power profile of a location tag 130 connecting to the network system 190 is illustrated. For example, various data can be transmitted therebetween to negotiate and establish a Bluetooth paring. The location tag 130 can also transmit the shock, vibration, and/or orientation data collected at 704 to the network system 190 over the established connection.

At 712, the power profile of a location tag 130 measuring various atmospheric characteristics, such as temperature, humidity, air pressure, light, sound, radiation, and/or gas concentration etc., is illustrated. The location tag 130 can measure these atmospheric characteristics using the environmental sensors 240 included on the secondary board 230B. The location tag 130 can also transmit the atmospheric characteristics to the network system 190 at 712.

As shown, the greatest power consumption occurs at 712 when the environmental sensors collect atmospheric data. Using the methods described herein, the sensing and transmission intervals for environmental sensors can be optimized to minimize power usage and preserve battery life, while providing sufficient data resolution. For example, shock, vibration, and/or orientation data may be collected at a shorter sensing interval as compared to the atmospheric data.

At 714, the power profile of a location tag 130 that has been deactivated is illustrated. A deactivated location tag 130 may be deactivated by switching off all power supply, or having the location tag 130 enter a sleep mode, or any other way to make the location tag 130 inoperational.

Figure 11:
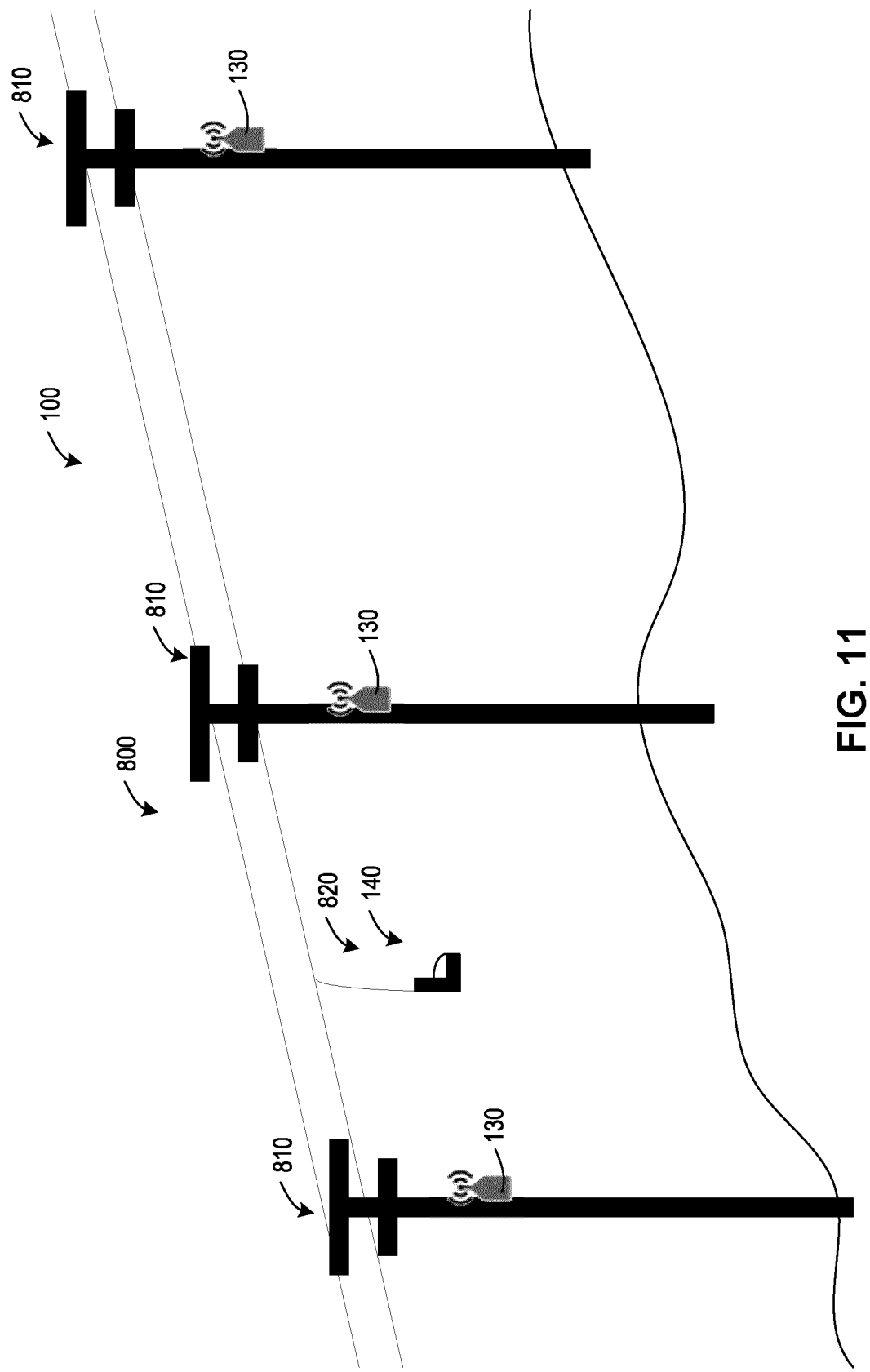
FIG. 11 is a block diagram of another example monitoring system, in accordance with an embodiment.
Figure 12:
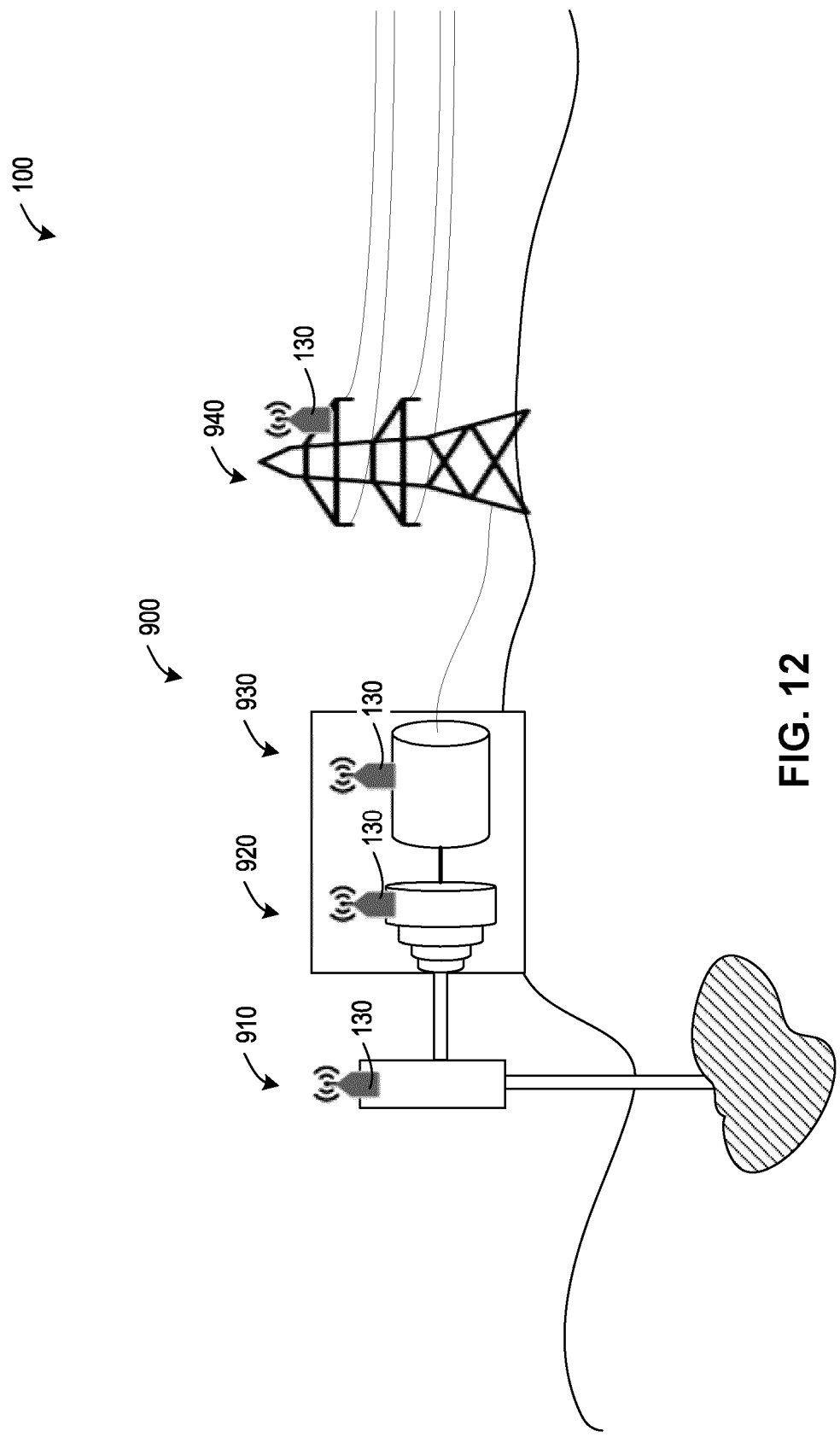
FIG. 12 is a block diagram of another example monitoring system, in accordance with an embodiment.
Figure 13C:
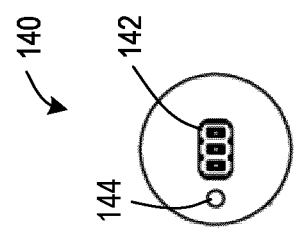
FIG. 13C is a bottom view of the mobile receiver shown in FIG. 13A.
Figure 13B:
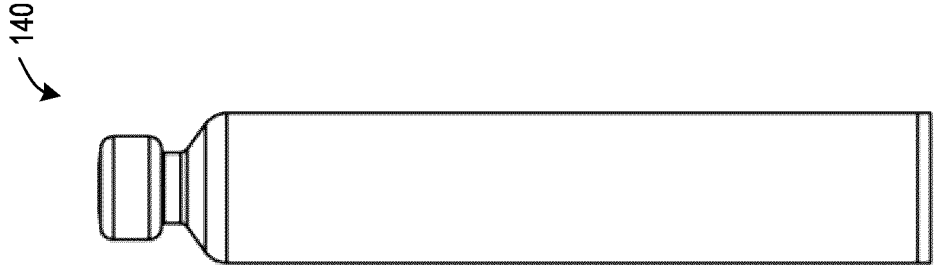
FIG. 13B is a side view of the mobile receiver shown in FIG. 13A.
Figure 13A:
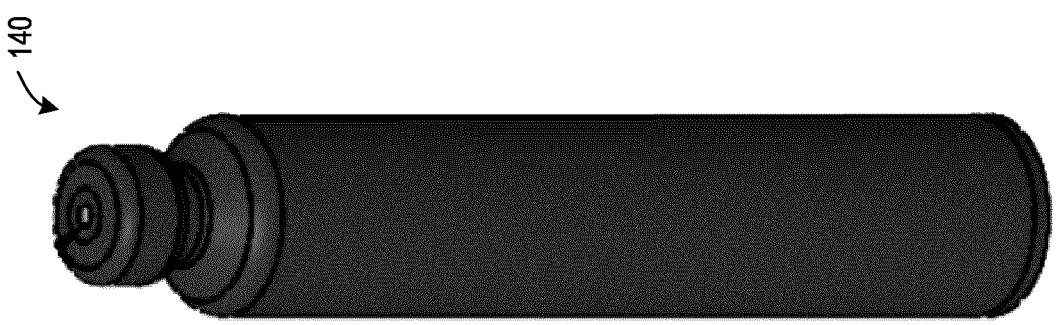
FIG. 13A is a perspective view of an example mobile receiver.
Figure 13D:
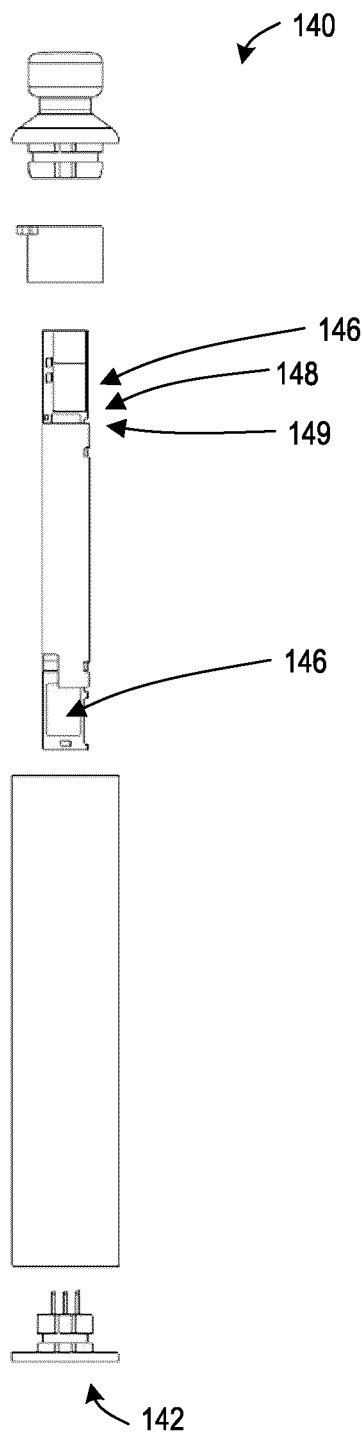
FIG. 13D is an exploded view of the mobile receiver shown in FIG. 13A.

Reference will now be made to FIGS. 11 and 12 which show further example implementations of a monitoring system 100 in different environments.

Referring now to FIG. 11, there is shown another example implementation of a monitoring system 100. In the illustrated example, the monitoring system 100 is used to monitor a plurality of assets in a ski lift system 800. As shown, the location tags 130 are disposed along the towers 810 at various assets of the ski lift system 800. The mobile receiver 140 can be installed in a chair 820 of the ski lift system 800. In some cases, the mobile receiver 140 includes the location tag 130 as well.

The mobile receiver 140, equipped with the location tag 130, can measure various conditions at the chair 820. The location of the mobile receiver 140 can be determined from the location tags 130, as described herein. Alternatively, the mobile receiver 140 can include a location sensor to determine the position of the mobile receiver 140 as it moves while in operation. The location tags 130 can concurrently monitor environmental conditions at various other components of the ski lift system 800, such as various wheels, gearings, and motors.

Referring now to FIG. 12, there is shown another example implementation of a monitoring system 100. In the illustrated example, the monitoring system 100 is used to monitor a plurality of assets in a power plant 900. As shown, the location tags 130 are disposed at various areas of the power plant 900, including, pump 910, turbine 920 generator 930, and transformer 940. The location tags 130 can monitor environmental conditions at various assets of the power plant 900, such as various pumps, fans, blowers and turbines. In the illustrated example, there is no mobile receiver 140.

Notwithstanding the above examples, it should be appreciated that the monitoring systems 100 described herein can be implemented in various configurations. In some implementations, the monitoring system 100 includes one or more location tags 130, and does not include any mobile receivers 140. In other implementations, the monitoring system 100 includes one or more mobile receivers 140, and does not include any location tags 130. In yet other implementations, the monitoring system 100 includes both one or more location tags 130 and one or more mobile receivers 140. In various embodiments, some aspects of one or more location tags 130 may be integrated into a mobile receiver 140.

It should also be understood that the monitoring systems 100 described herein can be implemented in various other environments. For example, the monitoring system 100 may be implemented in mining hoist or mining transfer conveyor systems. The location tags 130 can be positioned along the hoist or conveyor system and the mobile receiver 140 can be transported by the hoist or conveyor system past the location tags 130. The mobile receiver 140 and the location tags 130 can monitor various machines and locations in the mining environment.

In some cases, the monitoring system 100 can be implemented in a paper making system. For example, the location tags 130 can be positioned along a paper machine felt and the mobile receiver 140 can be transported by the paper machine felt past the location tags 130. The mobile receiver 140 and the location tags 130 can monitor various machines and locations in the paper making environment, such as the dryer, press, fourdrinier, calendar, and/or winder.

In some cases, the monitoring system 100 can be implemented in a pulp making system. For example, the location tags 130 can be positioned along a chip and fiber belt conveyance and the mobile receiver 140 can be transported by the conveyance past the location tags 130. The mobile receiver 140 and the location tags 130 can monitor various machines and locations in the pulp making environment, such as the chip delivery conveyor, bucket elevator, etc.

In some cases, the monitoring system 100 can be implemented in a train system. For example, the mobile receiver 140 may be installed in a train car and monitor the rail car and track conditions. Location tags 130 may not be used given the speed and distance traveled. The mobile receiver 140 may instead include an internal location tracking mechanism, such as a GPS module.

In some cases, the monitoring system 100 can be implemented in a ship loader system. For example, the location tags 130 can be positioned along a conveyance of the ship loader system and the mobile receiver 140 can be transported by the conveyance past the location tags 130. The mobile receiver 140 and the location tags 130 can monitor various machines and locations in the ship loading environment, such as the ship loader arm.

In some cases, the monitoring system 100 can be implemented in an offshore drilling platform. For example, the location tags 130 can be positioned at and monitor various assets, such as mud pumps, azimuth drives, gas compressors, injection pumps, and the like.

In some cases, the monitoring system 100 can be implemented in a municipal waste system. For example, the location tags 130 can be positioned at and monitor various assets, such as waste water pumps, aeration blowers and pond skimmers.

In some cases, the monitoring system 100 can be implemented in a HVAC system. For example, the location tags 130 can be positioned at and monitor various assets, such as HVAC fans.

In some cases, the monitoring system 100 can be implemented in a marine system. For example, the location tags 130 can be positioned at and monitor various assets, such as propulsion engines, propulsion drive train, steering, hydraulics, etc.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for monitoring a plurality of assets, the plurality of assets comprising a conveyor system and at least one other asset, the system comprising:
   a plurality of location tags, at least a subset of the location tags positioned at a fixed position along the conveyor system, and at least one location tag positioned at the at least one other asset, at least one of the at least one other asset being a geographically-fixed asset, wherein a mobile receiver is moveable with respect to the conveyor system such that the distance between the mobile receiver and the subset of the location tags positioned along a conveyor system is changeable;
   each location tag comprises at least one environmental sensor configured to measure at least one environmental characteristic at a location of the corresponding location tag;
   each location tag comprises a communication interface configured to transmit a sensor signal corresponding to the at least one environmental characteristic to a network system;
   the communication interface of each location tag of the subset of the location tags positioned along the conveyor system is configured to transmit at least one information signal to the mobile receiver, wherein a position of the mobile receiver is determined based on a signal strength of the corresponding information signal;
   the communication interface of each location tag is configured to transmit the sensor signal at a pre-determined transmission interval;
   the network system is configured to correlate, in real time, the position of the mobile receiver and the at least one environmental characteristic measured by one or more of the subset of the location tags positioned along the conveyor system;
   the network system is additionally configured to correlate, in real time, the at least one environmental characteristic with the location of the corresponding location tag positioned at the at least one other asset; and
   the network system is configured to determine a state of one or more of the plurality of assets based on the correlating.

2. The system of claim 1, wherein at least one location tag is operable to detect at least one trigger event when at least one environmental characteristic measured by the at least one location tag exceeds a predetermined threshold, and in response to detecting the at least one trigger event, transmit an alert to the network system.

3. The system of claim 1, wherein at least one of i) the network system and ii) at least one location tag, is operable to detect at least one trigger event when at least one environmental characteristic measured by the at least one location tag exceeds a predetermined threshold, and in response to detecting the at least one trigger event, adjust the transmission interval for transmitting the sensor signal at the at least one location tag.

4. The system of claim 1, wherein at least one of i) the network system and ii) at least one location tag is operable to detect at least one trigger event when at least one environmental characteristic measured by the at least one location tag exceeds a predetermined threshold, and in response to detecting the at least one trigger event, adjust a sensing interval for measuring the at least one environmental characteristic at the at least one location tag.

5. The system of claim 1, wherein the at least one environmental sensor comprises at least one vibration sensor, and wherein the sensor signal comprises: i) a time series of vibration measurements, or ii) a frequency series of vibration measurements.

6. The system of claim 5, wherein the sensor signal comprises at least one vibration event, and wherein the location tag detects a vibration event if: a magnitude of a vibration measurement exceeds a predetermined vibration magnitude, or ii) a frequency of a vibration measurement is within a predetermined vibration frequency band.

7. The system of claim 6, wherein the at least one vibration event is transmitted at a first transmission interval, and the at least one of the time series of vibration measurements and the frequency series of vibration measurements is transmitted at a second transmission interval that is slower than the first transmission interval.

8. The system of claim 5, wherein:
each location tag comprises a rigid housing body; and
the at least one environmental sensor and the communication module are rigidly mounted within the rigid housing body so that the corresponding location tag has a mounted natural frequency greater than the frequency of the vibrations measured by the at least one vibration sensor.

9. The system of claim 1, wherein:
the at least one environmental sensor comprises at least one atmospheric sensor; and
at least one channel extends between the exterior of the location tag and the at least one atmospheric sensor, the at least one channel selectively sealed by a liquid impermeable membrane so that air can enter the at least one channel.

10. The system of claim 1, wherein:
each location tag comprises a power supply and at least one regulator, the at least one regulator operable to receive electrical power having a first power level from the power supply and generate electrical power having a second power level that is different from the first power level, wherein the at least one environmental sensor is operable at the first power level directly from the power supply, and at least one other environmental sensor is operable at the second power level received from the at least one regulator.

11. A method for monitoring a plurality of assets using a plurality of location tags, the plurality of assets comprising a conveyor system and at least one other asset, at least a subset of the location tags positioned at a fixed position along the conveyor system, and at least one location tag positioned at the at least one other asset, at least one of the at least one other asset being a geographically-fixed asset, wherein a mobile receiver is moveable with respect to the conveyor system such that the distance between the mobile receiver and the subset of the location tags positioned along the conveyor system is changeable, the method comprising:
measuring, by each location tag, at least one environmental characteristic at a location of the corresponding location tag;
transmitting, by each location tag, a sensor signal corresponding to the at least one environmental characteristic to a network system;
transmitting, by each location tag of the subset of the location tags positioned along the conveyor system, at least one information signal to the mobile receiver, wherein a position of the mobile receiver is determined based on a signal strength of the corresponding information signal;
correlating, in real time, by the network system, the position of the mobile receiver and the at least one environmental characteristic measured by one or more of the subset of the location tags positioned along the conveyor system;
correlating, in real time, by the network system, the at least one environmental characteristic with the location of the corresponding location tag positioned at the at least one other asset; and
determining based on the correlating, a state of one or more of the plurality of assets,
wherein the sensor signal is transmitted at a pre-determined transmission interval.

12. The method of claim 11, further comprising:
detecting at least one trigger event when at least one environmental characteristic measured by the at least one location tag exceeds a predetermined threshold, and in response to detecting the at least one trigger event, transmitting an alert to the network system.

13. The method of claim 11, further comprising:
detecting at least one trigger event when at least one environmental characteristic measured by the at least one location tag exceeds a predetermined threshold, and in response to detecting the at least one trigger event, adjusting the transmission interval for transmitting the sensor signal at the at least one location tag.

14. The method of claim 11, further comprising:
detecting at least one trigger event when at least one environmental characteristic measured by the at least one location tag exceeds a predetermined threshold, and in response to detecting the at least one trigger event, adjusting a sensing interval for measuring the at least one environmental characteristic at the at least one location tag.

15. The method of claim 11, wherein the at least one environmental characteristic comprises at least one vibration characteristic and wherein the sensor signal comprises: i) a time series of vibration measurements, or ii) a frequency series of vibration measurements.

16. The method of claim 15, wherein the sensor signal comprises at least one vibration event, and wherein the location tag detects a vibration event if: a magnitude of a vibration measurement exceeds a predetermined vibration magnitude, or ii) a frequency of a vibration measurement is within a predetermined vibration frequency band.

17. The method of claim 16, wherein the at least one vibration event is transmitted at a first transmission interval, and the at least one of the time series of vibration measurements and the frequency series of vibration measurements is transmitted at a second transmission interval that is slower than the first transmission interval.

18. The method of claim 11, wherein the at least one environmental characteristic comprises at least one atmospheric characteristic.

19. The system of claim 1, wherein the mobile receiver is a location tag.

20. The system of claim 1, wherein the mobile receiver comprises a location tag affixed to the mobile receiver.

* * * * *